US006587867B1

United States Patent
Miller et al.

(10) Patent No.: US 6,587,867 B1
(45) Date of Patent: *Jul. 1, 2003

(54) INTERNET-BASED SUBSCRIBER PROFILE MANAGEMENT OF A COMMUNICATIONS SYSTEM

(75) Inventors: James Allen Miller, Cedar Rapids, IA (US); Ram S. Vaidya, Cedar Rapids, IA (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 64 days.

(21) Appl. No.: 08/862,134

(22) Filed: May 22, 1997

(51) Int. Cl.[7] .............................................. G06F 15/16
(52) U.S. Cl. ......................... 709/200; 705/38; 705/39; 705/44
(58) Field of Search ........................... 395/187.01, 186, 395/200.55, 200.3, 200.59, 200.53; 713/201, 200; 709/200, 225, 228, 223; 705/38, 39, 44

(56) References Cited

U.S. PATENT DOCUMENTS

| 3,506,791 A | 4/1970 | Halaby ........................ 179/41 |
| 3,676,603 A | 7/1972 | Budrys ..................... 179/18 BF |
| 3,854,013 A | 12/1974 | Altenburger et al. ... 179/18 BE |

(List continued on next page.)

FOREIGN PATENT DOCUMENTS

| EP | 0152908 | 8/1985 |
| EP | 0216381 | 4/1987 |
| EP | 0216515 | 4/1987 |
| EP | 0330441 | 8/1989 |
| EP | 0 698987 A2 | * 8/1995 |
| GB | 2198910 | 6/1988 |
| WO | 94/23523 | * 10/1994 |
| WO | 96/15616 | * 5/1996 |
| WO | WO 97 23988 | 7/1997 |

OTHER PUBLICATIONS

Kopec et al., "Electronic Business Telephone," *GTE Automatic Electric Journal*, Mar. 1981, pp. 34–40.
An et al., "Direct Dialing of Credit Card Calls," *1981 International Conference on Communications*, Denver, Colorado, Jun. 1981, pp. 44.1.1–44.1.5.
Product Reference Guide: "SR 1000 PBX Digital Private Branch Exchange," Solid State Systems Inc., Nov. 1987.
Perkins, Ed, How to Get Big Discounts on Airfares, Hotels, Car Rentals, and More, *Consumer Reports 1992 Travel Buying Guide*, Consumer Reports Books, Yonkers, NY 1992, pp. 293–299.
"Full–Time Fax Forwarding," *Macworld*, May 1993, p. 81.
Rosenbaum. Ron, "Secrets of the Little Blue Box," *Esquire Magazine*, Oct. 1971, p. 116.
User's Guide for the LOGOS ES1 by Logotronix, Boulder, Colorado.
Anderson et al. "Flexible session level authentication with off the shelf servers and clinents", Computer Networks and ISDN Systems.

*Primary Examiner*—Matthew C. Bella
*Assistant Examiner*—Mackly Monestime

(57) ABSTRACT

A telecommunications system includes multiple services. For example, the system provides multiple communications services with a single number for a subscriber. The subscriber can easily configure, manage and update these services via the Internet, by accessing a service or subscriber profile detailing the services specific to the subscriber The subscriber profile specifies which communication services the subscriber wishes to provide to different people who call the subscriber' telephone number. The system provides a World Wide Web access method to the subscriber's profile. The system includes security safeguards to ensure security to the system.

10 Claims, 18 Drawing Sheets

U.S. PATENT DOCUMENTS

| | | | |
|---|---|---|---|
| 3,959,600 A | 5/1976 | Sousa | 179/18 BE |
| 3,997,731 A | 12/1976 | Wilmot et al. | 179/18 B |
| 4,054,756 A | 10/1977 | Comella et al. | 179/18 B |
| 4,065,642 A | 12/1977 | McClure | 179/18 B |
| 4,072,824 A | 2/1978 | Phillips | 179/18 B |
| 4,086,438 A | 4/1978 | Kahn et al. | 179/18 BE |
| 4,266,098 A | 5/1981 | Novak | 179/5.5 |
| 4,277,649 A | 7/1981 | Sheinbein | 179/18 B |
| 4,278,844 A | 7/1981 | Jones | 179/18 B |
| 4,313,035 A | 1/1982 | Jordan et al. | 179/18 BE |
| 4,369,339 A | 1/1983 | Castro et al. | 179/84 C |
| 4,420,656 A | 12/1983 | Freeman | 179/6.04 |
| 4,475,009 A | 10/1984 | Rais et al. | 179/2 A |
| 4,488,005 A | 12/1984 | Frantz | 179/18 B |
| 4,578,540 A | 3/1986 | Borg et al. | 179/2 A |
| 4,591,664 A | 5/1986 | Freeman | 179/6.06 |
| 4,611,094 A | 9/1986 | Asmuth et al. | 179/7.1 TP |
| 4,611,096 A | 9/1986 | Asmuth et al. | 179/18 B |
| 4,625,081 A | 11/1986 | Lotito et al. | 379/88 |
| 4,670,628 A | 6/1987 | Boratgis et al. | 379/69 |
| 4,674,115 A | 6/1987 | Kaleita et al. | 379/201 |
| 4,737,976 A | 4/1988 | Borth et al. | 379/58 |
| 4,747,124 A | 5/1988 | Ladd | 379/67 |
| 4,752,951 A | 6/1988 | Konneker | 379/211 |
| 4,783,796 A | 11/1988 | Ladd | 379/67 |
| 4,814,763 A | 3/1989 | Nelson et al. | 340/825.44 |
| 4,821,308 A | 4/1989 | Hashimoto | 379/57 |
| 4,823,123 A | 4/1989 | Siwiak | 340/825.44 |
| 4,847,890 A | 7/1989 | Solomon et al. | 379/6.7 |
| 4,875,038 A | 10/1989 | Siwiak et al. | 340/825.44 |
| 4,878,240 A | 10/1989 | Lin et al. | 379/67 |
| 4,893,329 A | 1/1990 | O'Brien | 379/88 |
| 4,893,335 A | 1/1990 | Fuller et al. | 379/200 |
| 4,899,373 A | 2/1990 | Lee et al. | 379/207 |
| 4,920,562 A | 4/1990 | Hird et al. | 379/132 |
| 4,926,462 A | 5/1990 | Ladd et al. | 379/67 |
| 4,932,042 A | 6/1990 | Baral et al. | 379/67 |
| 4,933,965 A | 6/1990 | Hird et al. | 379/112 |
| 4,935,956 A | 6/1990 | Hellwarth et al. | 379/112 |
| 4,942,598 A | 7/1990 | Davis | 379/57 |
| 4,955,047 A | 9/1990 | Morganstein et al. | 379/112 |
| 5,020,095 A | 5/1991 | Morganstein et al. | 379/67 |
| 5,027,384 A | 6/1991 | Morganstein | 379/67 |
| 5,029,196 A | 7/1991 | Morganstein | 379/67 |
| 5,063,588 A | 11/1991 | Patsiokas et al. | 379/57 |
| 5,090,051 A | 2/1992 | Muppidi et al. | 379/61 |
| 5,151,929 A | 9/1992 | Wolf | 379/57 |
| 5,193,110 A | 3/1993 | Jones et al. | 379/94 |
| 5,199,062 A | 3/1993 | Von Meister et al. | 379/67 |
| 5,222,120 A | 6/1993 | McLeod et al. | 379/88 |
| 5,222,125 A | 6/1993 | Creswell et al. | 379/67 |
| 5,260,986 A | 11/1993 | Pershan | 379/57 |
| 5,276,731 A | 1/1994 | Arbel et al. | 379/88 |
| 5,307,399 A | 4/1994 | Dai et al. | 379/57 |
| 5,315,636 A | 5/1994 | Patel | 379/58 |
| 5,375,161 A | 12/1994 | Fuller et al. | 379/57 |
| 5,384,831 A | 1/1995 | Creswall et al. | 379/67 |
| 5,394,463 A | 2/1995 | Fischell et al. | 379/201 |
| 5,450,479 A | 9/1995 | Alesio et al. | 379/144 |
| 5,561,706 A * | 10/1996 | Fenner | 455/406 |
| 5,588,037 A | 12/1996 | Fuller et al. | 379/57 |
| 5,592,541 A * | 1/1997 | Fleischer, III et al. | 379/211 |
| 5,721,765 A * | 2/1998 | Smith | 379/93.03 |
| 5,740,231 A * | 4/1998 | Cohn et al. | 379/88 |
| 5,742,905 A * | 4/1998 | Pepe et al. | 455/461 |
| 5,793,854 A * | 8/1998 | Kashepava | 379/130 |
| 5,809,415 A * | 9/1998 | Rossmann | 455/422 |
| 5,878,219 A * | 3/1999 | Vance, Jr. et al. | 709/217 |
| 5,901,284 A * | 5/1999 | Hamdy-Swink | 340/852.32 |
| 5,903,845 A * | 5/1999 | Buhrmann et al. | 455/461 |
| 5,956,391 A * | 9/1999 | Melen et al. | 379/114 |
| 5,958,016 A * | 9/1999 | Chang et al. | 709/229 |
| 5,999,525 A * | 12/1999 | Krishnaswamy et al. | 370/352 |
| 6,018,575 A | 1/2000 | Gross et al. | |
| 6,330,079 B1 | 12/2001 | Dugan et al. | |

* cited by examiner

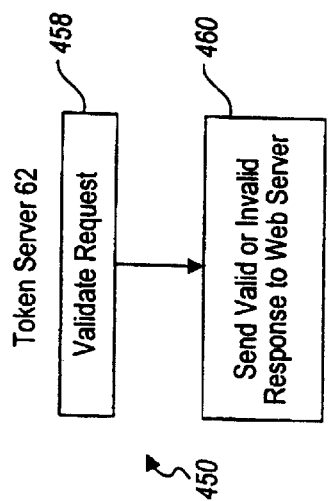
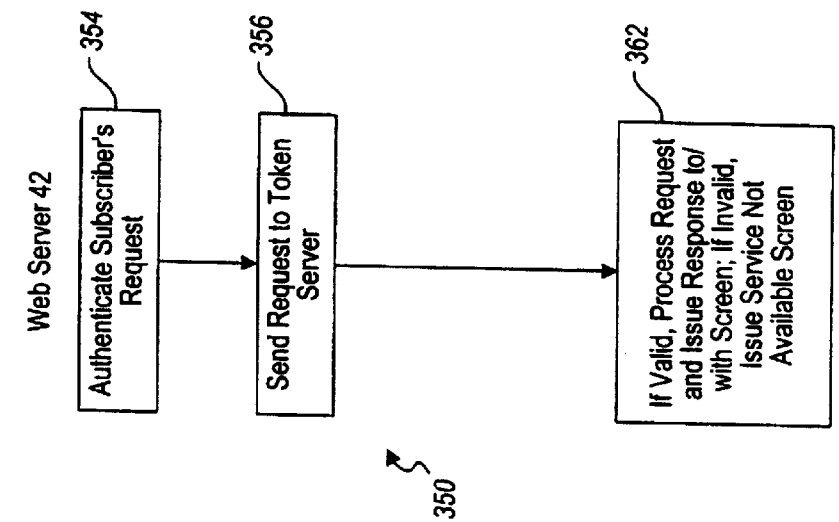
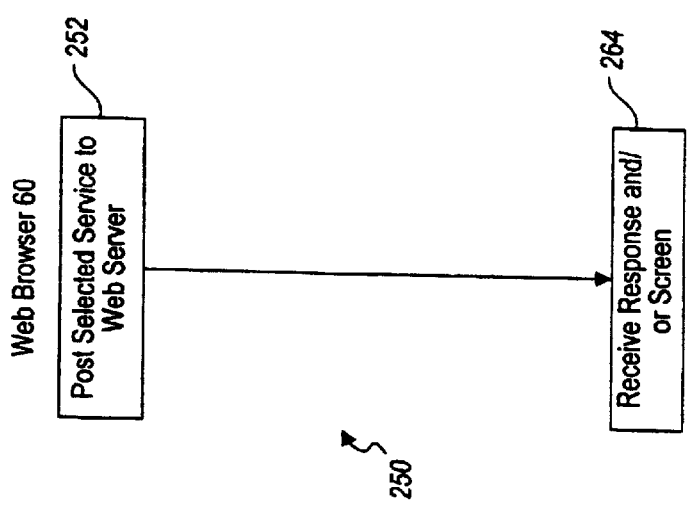

Guest Menu

In order to complete the selections on this screen, please make sure you have checked this option, 'Guest Menu', on the Routing Screen. If you have not, please return to the Call Routing Screen and select this option.

Present the following selected options to my guests:

150 —
- ☑ Find-Me Routing*
  (This options allows the guest to speak to you directly)
  - ○ Schedule Routing
    (To set schedule routing, call directlineMCI Customer Service at 1-800-870-5898)
  - ○ Three Number Sequence
    (Enter up to three phone number to locate you and the maximum number of rings for each number. For international numbers include 011, the country and city codes as applicable)

|  | Number | Ring Limit |
    |---|---|---|
    | 1st # | | |
    | 2nd # | | |
    | 3rd # | | |

(1 to 16 rings)

152 —
- ☑ Leave a Voicemail*
- ☑ Send a Fax*
- ☐ Send a Page

*To select or deselect this option, you must contact directlineMCI Customer Service at 1-800-870-5898)

[ Update Guest Menu ]  [ Reset ]

No Menu - Override Routing

In order to complete the selections on this screen, please make sure you have checked this option, 'No Menu - Override' on the Call Routing Screen. If you have not, please return to Call Routing Screen and select this option.

Route my guests to:

○ Find-Me Routing
(This options allows the guest to speak to you directly)

○ Schedule Routing
(To set schedule routing, call directlineMCI Customer Service at 1-800-870-5898)

○ Three Number Sequence
(Enter up to three phone number to locate you and the maximum number of rings for each number. For international numbers include 011, the country and city codes as applicable)

| | Number | Ring Limit |
|---|---|---|
| 1st # | | |
| 2nd # | | |
| 3rd # | | |

(1 to 16 rings)

○ Voicemail

○ Pager

○ Temporary Override Number

| Number | Ring Limit |
|---|---|
| | |

[ Update Override Routing ]   [ Reset ]

Speed Dial Numbers

You can program up to frequently dialed numbers - either domestic or international - below. For international numbers, include 011, the country and city codes as applicable.

154 — 1 [ ]  6 [ ]
2 [ ]  7 [ ]
3 [ ]  8 [ ]
4 [ ]  9 [ ]
5 [ ]

[Update Speed Dial Numbers]  [Reset]

*Fig. 13*

Voicemail

☑ Receive Voicemail Messages*
*To select or deselect this option, you must contact directlineMCI Customer Service at 1-800-870-5898.

☐ Page me each time I receive a Voicemail Message

[ Update Voicemail ]   [ Reset ]

*Fig. 14*   136

Faxmail

My primary Fax number is NPA-Nxx-xxxx

☑ Receive Fax Messages*
*To select or deselect this option, you must contact directlineMCI Customer Service at 1-800-870-5898.

☐ Page me each time I receive a Fax Message

[ Update Faxmail ]   [ Reset ]

*Fig. 15*   138

Call Screening

☐ Allow me to screen my incoming calls by:
  ○ Name only
  (If guest does not provide name, directlineMCI will provide the guest's telephone number)
  ○ Telephone Number only
  ○ Name and Telephone Number

156

[ Update Call Screening ]   [ Reset ]

*Fig. 16*   140

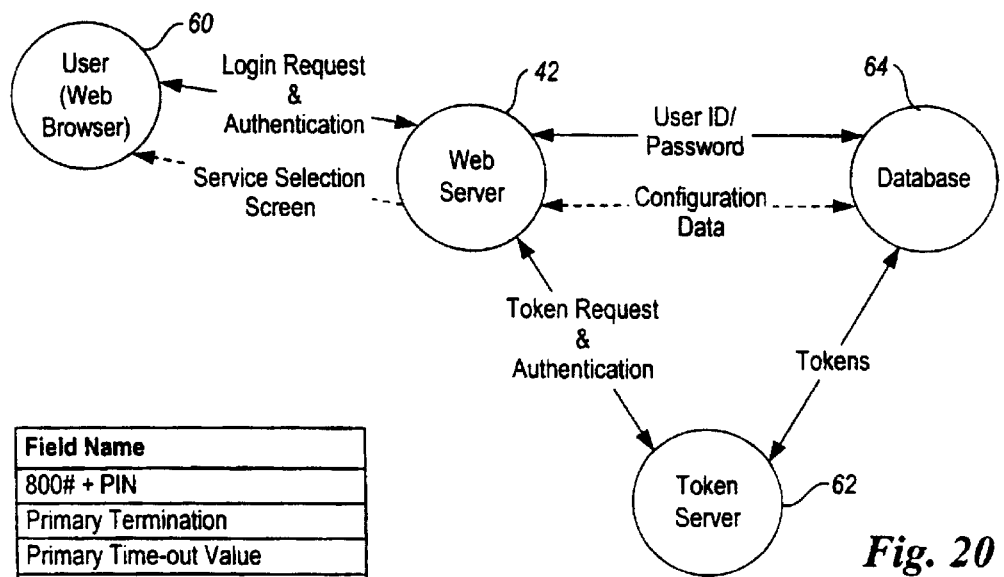

*Fig. 20*

| Field Name |
| --- |
| 800# + PIN |
| Primary Termination |
| Primary Time-out Value |
| Secondary Termination |
| Secondary Time-out Value |
| Tertiary Termination |
| Tertiary Time-out Value |
| Override Routing |
| Override Time-out Value |
| Alternate Routing |
| Alternate Time-out Value |
| PIN_Flags, specifically:<br>    Bit 10  Schedule 1<br>    Bit 11  Schedule 2<br>    Bit 15  Page on Vmail<br>    Bit 16  Page on Fax |
| State_Flags, specifically:<br>    Bit 3   Account Available<br>    Bit 13  Pager On/Off<br>    Bit 14  Find-Me On/Off<br>    Bit 15  Voicemail On/Off<br>    Bit 16  Fax On/Off |
| Call Screening State |
| Default Fax Number |
| Speed Dial #1 |
| Speed Dial #2 |
| Speed Dial #3 |
| Speed Dial #4 |
| Speed Dial #5 |
| Speed Dial #6 |
| Speed Dial #7 |
| Speed Dial #8 |
| Speed Dial #9 |

*Fig. 21*

INTERNET-BASED SUBSCRIBER PROFILE MANAGEMENT OF A COMMUNICATIONS SYSTEM

TECHNICAL FIELD

The present invention relates generally to telecommunications systems and more particularly to managing telecommunication systems such as systems having single telephone number access to multiple communications services.

BACKGROUND OF THE INVENTION

In conventional telecommunications systems, a number of different telecommunications services are offered to subscribers. Each telecommunications service typically requires a unique telephone number. Examples of telecommunications services that require a unique telephone number are automatic routing services, voicemail services, facsimile services, paging services, cellular phone services and personal 800 numbers. One of the drawbacks of each service requiring a different telephone number is that managing and publishing multiple telephone numbers for a subscriber that uses multiple communications services can prove to be quite cumbersome. For example, a subscriber may have to provide a first telephone number for facsimile services, a second telephone number for voicemail services, and a third telephone number for cellular services. Thus, a subscriber must remember all of the unique telephone numbers and must make clear to people to whom the subscriber gives the telephone numbers what services are associated with what telephone numbers. Oftentimes, a party confuses the mapping of telephone numbers to services and reaches the wrong service when dialing the telephone number that was given to the party. For instance, a caller may dial a number thinking that he will reach a person and instead the caller reaches a facsimile machine.

Another drawback of conventional systems is the lack of flexibility regarding the telecommunications services that are provided to subscribers. A subscriber may need to provide access to different services to different people at various times. For example, a subscriber may need to have phone calls directed to the subscriber's workplace during the work week but may need to have phone calls directed to his home or cellular phone on weekends. The subscriber may also wish to limit the people that may reach the subscriber by phone on the weekends. Still further, the subscriber may wish to provide other people with access to his voicemail.

Unfortunately, with conventional systems such configurability of telecommunications services is not available. Moreover, a subscriber has difficulty managing a multitude of communication services, where each service has a different number. For example, if the subscriber wishes to update multiple aspects of his or her service (e.g., voicemail) over a phone, multiple iterative menu selections and presentations are required.

SUMMARY OF THE INVENTION

The present invention embodies a computer-implemented method for use in a communications system coupled to the Internet. The method includes the steps of: (a) receiving a request for access, via the Internet, of a subscriber specific record relating to the system; (b) receiving, via the Internet, alternate data for the record; and (c) updating the record based on the received alternate data.

The present invention also embodies an apparatus in a telecommunications network. The apparatus includes a memory and a network server. The memory stores a subscriber specific record relating to the system. The network server is coupled between the memory and the Internet. The network server (a) receives a request for access, via the Internet of the record, (b) receives via the Internet, alternate data for the record, and (c) requests alteration of the record in the memory based on the received alternate date.

BRIEF DESCRIPTION OF THE DRAWINGS

An exemplary embodiment of the present invention will be described in more detail below relative to the following figures.

FIGS. 9A–9C are flow diagrams showing steps performed by the web browser, web server and token server, respectively, of FIG. 2 during the service selecting process of FIG. 8.

FIG. 11 is a front view of a computer screen showing an exemplary guest menu option screen.

FIG. 12 is a front view of a computer screen showing an exemplary override routing option screen.

FIG. 13 is a front view of a computer screen showing an exemplary speed dial number selection screen.

FIG. 14 is a front view of a computer screen showing an exemplary voice mail options screen.

FIG. 15 is a front view of a computer screen showing an exemplary fax mail options screen.

FIG. 16 is a front view of a computer screen showing an exemplary call screening options screen.

FIG. 20 is an exemplary data flow diagram, including data flow with respect to tokens under the system portion of FIG. 2.

FIG. 21 is an exemplary subscriber profile with exemplary fields therein.

DETAILED DESCRIPTION OF THE INVENTION

I. Overview

Figure 1A:
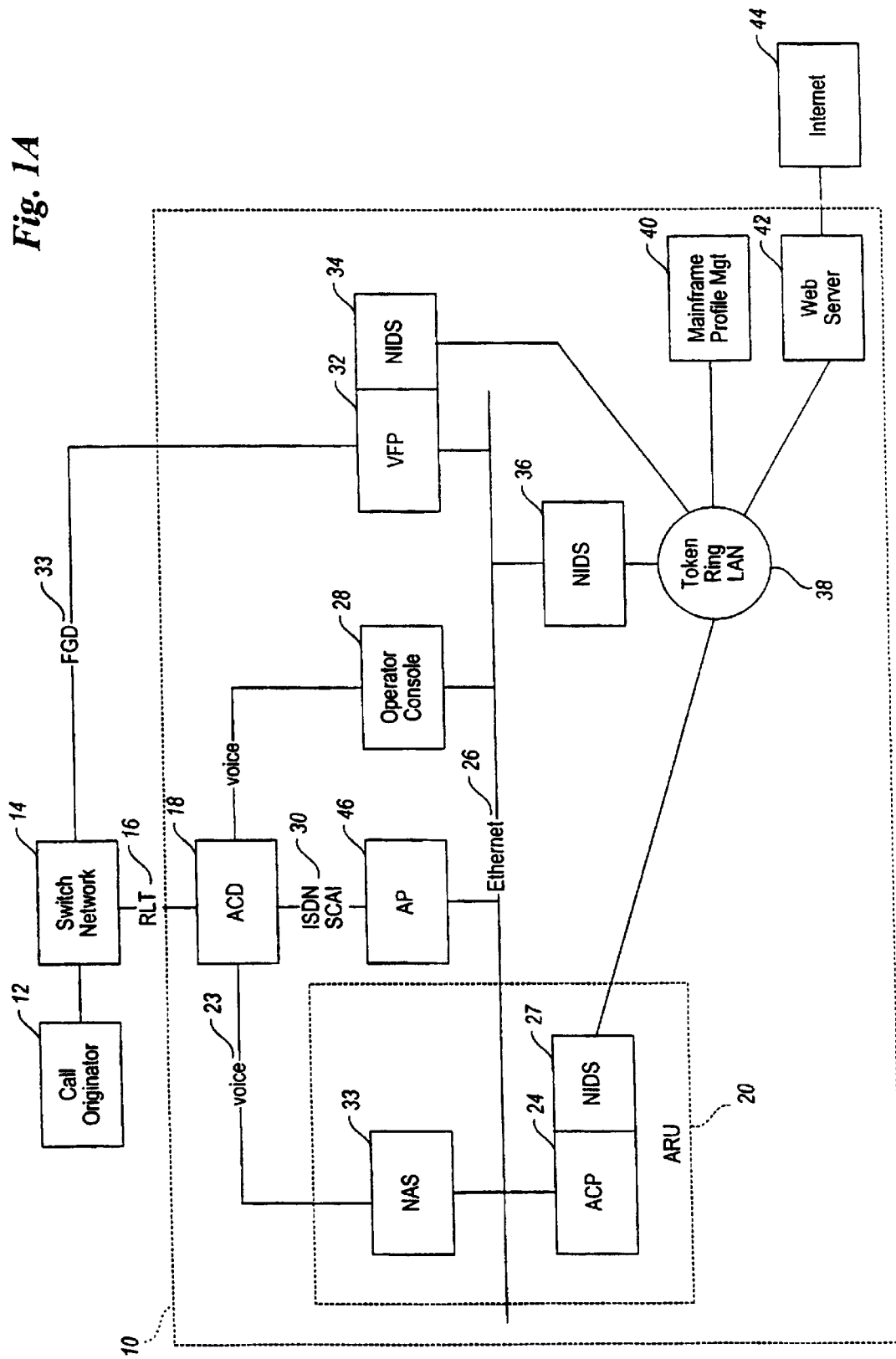
FIG. 1A is a block diagram that shows a first system configuration that is suitable for practicing the exemplary embodiment of the present invention.

A system that overcomes problems of the prior art is described in detail in co-pending U.S. patent application No. 08/925,447, entitled, "Single Telephone Number Access to Multiple Communications Services," filed Sep. 8, 1997, and assigned to the assignee of the present application. As described in this application, a platform enables multiple telecommunications services to be accessible through a single telephone number. Thus, for example, access to paging services, facsimile services, routing services, voicemail services, calling card services and personal 800 services, may be reached through a single telephone number. The subscriber has complete control over access to these services. In particular, the subscriber may specify what services are available to what people at what time. Hence, a first subset of the services to which the subscriber subscribes may be available to a first party at a first time and a second subset of services may be available to a second party at a second time. Moreover, a single party may have access to different subsets of the services depending on what time it is. The platform of the exemplary embodiment of the present invention also provides the subscriber with the ability to place multiple calls from any location using the same telephone number and billing all the calls to a single account.

The subscriber is assigned a single telephone number, such as a toll free 800 number or 888 number. This single telephone number may be used by other parties ("guests") to reach the subscriber at any destination telephone number programmed by the subscriber. In addition, the single phone number may be used to send a fax to the subscriber, to leave a voicemail message for the subscriber, or to page the subscriber. The subscriber may also program routing so that a call placed to the single telephone number of the subscriber reaches the subscriber at multiple locations. Also, as mentioned above, different callers may reach different services. As an example, calls from certain callers may automatically cause a page to be issued or automatically placed into voicemail.

A subscriber is assigned multiple personal identification numbers (PINs). Each PIN is a short sequence of alphanumeric characters. Each PIN is associated with a different service configuration. One of the PINs is assigned solely for use by the subscriber, and when the subscriber calls his assigned telephone number and enters his PIN, the platform knows that it is the subscriber who is calling and offers subscriber only services. The other PINs may be assigned to different service profiles. These PINs may be distributed to appropriate parties to specify what services would be available to those parties. For example, a first PIN may be given to family members of a subscriber, whereas a second PIN may be given to business associates of the subscriber. As a result, family members will have access to a first set of services and business associates will have access to a second set of services.

Multiple outbound calls to domestic destinations or international destinations will be billed to a single account. This account may be a calling card account, a credit card account, or an account that is specially designated for this grouping of the services. As result, a subscriber need not enter a calling card number multiple times when placing multiple calls. A subscriber may also access their account to make updates to a service profile that is maintained. As an example, the subscriber may change the terminating telephone numbers that are used to reach the subscriber. Similarly, a subscriber may change which callers are sent to voicemail and which callers automatically cause a page to be sent.

Under the above referenced U.S. patent application, subscribers access and alter their service profile by dialing into their account. Unfortunately, subscribers can typically only enter dual-tone multi-frequency (DTMF) input, such as the 12 DTMF buttons on typical phones. DTMF input is, therefore, limited. Under an embodiment of the present invention, subscribers can easily configure, manage, and update their service of subscriber profiles via a graphical user interface that the subscribers access via a computerized network or internetwork such as the Internet. When on the Internet, the subscribers access their profiles via The World Wide Web ("Web") access to specify which communications services the subscribers wish to provide to different people who call their single numbers.

Under an embodiment of the present invention, a subscriber can use any web browser and Internet access provider to access his or her subscriber profile. By entering a specific Internet address on their web browser, subscribers reach a web server which forms part of a system under an embodiment of the present invention. The system, including the web server, authenticates each subscriber. The system then provides a graphical user interface (GUI) in the form of user-friendly web pages that the subscribers use to update their subscriber profiles. These updates are recorded and updated in near real-time, so that the next call made to a subscriber's number will be serviced by the updated profile.

II. Platform Architecture

FIG. 1A is a block diagram that illustrates a first system architecture for practicing the exemplary embodiment of the present invention, where the system architecture is part of a larger telecommunications network. The system includes a platform 10 that encompasses multiple components. The platform 10 provides single telephone number access to multiple telecommunications services for a subscriber. The subscriber, in this context, is the customer to whom the single telephone number is assigned. The single telephone number may be accessed by both the subscriber and callers to the subscriber (i.e., guests). A call originator 12 depicted in FIG. 1A represents the origination of a call to the platform 10. This call may be from a subscriber or a caller who is seeking to reach the telephone number that is assigned to a subscriber. Moreover, the call may be from a facsimile machine or a computer. The call reaches a switch network 14 of the service provider in any of a number of different ways, including local exchange carrier, private line, dedicated access line, or international carrier. The switch network 14 routes the call to an automated call distributor (ACD) 18 within the platform 10 via a release link trunk (RLT) 16. The RLT 16 is a voice trunk that may be released from a call when the call is extended back to the switch network 14 by the ACD 18.

The ACD 18 routes incoming calls to the appropriate components within the platform for properly handling the calls. The ACD 18 is a conventional digital matrix switch that includes programs for performing call queuing and distribution. A suitable ACD is the Northern Telecom DMS-100.

The platform 10 also includes an application processor (AP) 46 that is associated with the ACD 18. The AP may be a dedicated computer system that provides intelligent application processing for the ACD 18. Certain functionality that may be performed by the ACD 18 is off-loaded to the AP 46 to enable the ACD to focus on performing the switching and queuing functionality. The AP 46 is linked to the ACD 18 via an Integrated Services Digital Network (ISDN) implementation of a switch/computer application interface (SCA) link 30.

The platform 10 includes an audio response unit (ARU) 20 that provides voice response and menu routing functions to a caller. The ARU 20 facilitates caller input via selection of DTMF digits, such as by pressing keys on a telephone keypad. The ARU 20 may provide various automated menus which the caller may navigate to reach a desired service. The ARU 20 includes a network audio server (NAS) 22, which is a server computer that has a voice telephony interface to the ACD 18. The NAS 22 is linked to the ACD 18 via multiple voice trunks 23 and, in general, provides an audio interface to a caller. The ARU 20 also includes an automated call processor (ACP) 24. The ACP 24 provides intelligent call processing functions for the ARU 20. The ARU 20 is responsible for handling all initial inbound calls for the platform 10. The ACP 24 operates by executing scripts that take callers through a series of menus, accept caller input, make decisions based upon caller input, and perform actions such as the transfer of a call to another destination to provide appropriate services. The ACP 24 prompts the NAS 22 to play scripts or prompts to callers, to gather DTMF digit input, to play various recorded messages, and to direct the caller to other destinations. The ACP 24 may be implemented on a high-grade mid-range computer, such as the IBM RS/6000 from International Business Machines Corporation, or a DEC alpha-based computer from Digital Equipment Corporation.

The scripts executed by the ACP 24 determine which communications services to provide to a caller and then provides those services by commanding the NAS 22 to transfer the call to the appropriate service provider. The scripts executed by the ACP 24 are customized to a subscriber by using a subscriber profile as input data. The subscriber profile is stored for use by the platform, as will also be described in more detail below. The subscriber profile specifies which services are available to a subscriber and guests and which destination numbers are to be used. The NAS 22 and ACP 24 may be linked, for example, by an Ethernet® local area network (LAN) 26 (Ethernet is a trademark of Xerox Corporation).

The platform 10 may include one or more operator consoles 28. These operator consoles 28 are specialized workstations that are operated by human operators. The operator consoles 28 may perform much of the same functionality as is performed by the ARU 20. In particular, the human operator at the operator console 28 may perform the appropriate scripts, prompting and transferring.

The platform 10 may have a voicemail/faxmail platform (VFP) 32. This platform collects, stores, and manages both voicemail messages and facsimile messages. It collects voicemail and facsimile messages over Feature Group D (FGD) trunks 33 from the switch network 14. Calls that require voicemail or facsimile services are transferred to the VFP 32 from the ARU 20, as will be described in more detail below. A transfer occurs with the assistance of the ACD 18 and the switch network 14. The VFP 32 is also connected to the Ethernet LAN 26.

The platform 10 may include multiple network implementation distribution servers (NIDS) 27, 34 and 36. Each of these NIDS may be implemented as a separate computer system. The NIDS may be redundant, and generally serve the role of storing database information, including subscriber profiles. The NIDS 27, 34 and 36 may all be connected to the Ethernet LAN 26 in the system configuration depicted in FIG. 1A.

The NIDS 27 is shown as part of the ARU 20 so that the ACP 24 can directly access subscriber profiles without having to go over the Ethernet LAN 26. In general, the ACP 24 submits database queries to the NIDS 27 to obtain data on the subscriber profile. The subscriber profile is used to determine what scripts to play for a caller, to determine what communications services can be offered to a caller, and to determine what destination telephone numbers and mailbox identifiers to use. The VFP 32 submits queries to the NIDS 34 for subscriber profile information and processing voicemail or facsimile messages.

The NIDS 27, 34 and 36 are also interconnected via a token ring local area network (LAN) 38. This LAN 38 is used for updates that are made to subscriber profiles and to keep the databases stored on the various NIDS consistent with a centralized profile database that is maintained by the mainframe profile management system 40 (which is on a dedicated mainframe or other suitable computer system). When a modification or update is made at one NIDS 27, 34 or 36, the affected NIDS sends a message to the mainframe profile management system 40, which makes the update to the centralized profile database and then ensures that each of the profile databases on the other NIDS are updated.

The platform 10 includes one or more web servers 42 that are connected to the token ring LAN 38 to provide a web site that a subscriber may access over the Internet 44. As described in detail below, the web page or pages at the web server 42 enables a subscriber to update the subscriber profile for the subscriber over the Internet. These updates may be forwarded to the mainframe profile management system 40, which in turn updates the information stored at the NIDS 27, 34 and 36. Alternatively, a NIDS may be resident with the web server such that the NIDS associated with the web server updates the profile information and passes the update on to the mainframe profile management system 40. Those skilled in the art will appreciate that the web server 42 may also be part of an intranet rather than the Internet. Still further, those skilled in the art will appreciate that the web server 42 may more generally be a program that provides a user interface to subscribers so that the subscribers may update service profile information via computer. Hence, a program may be a program resident on a server that is part of a distributed system such as a LAN or wide area network (WAN).

Figure 1B:
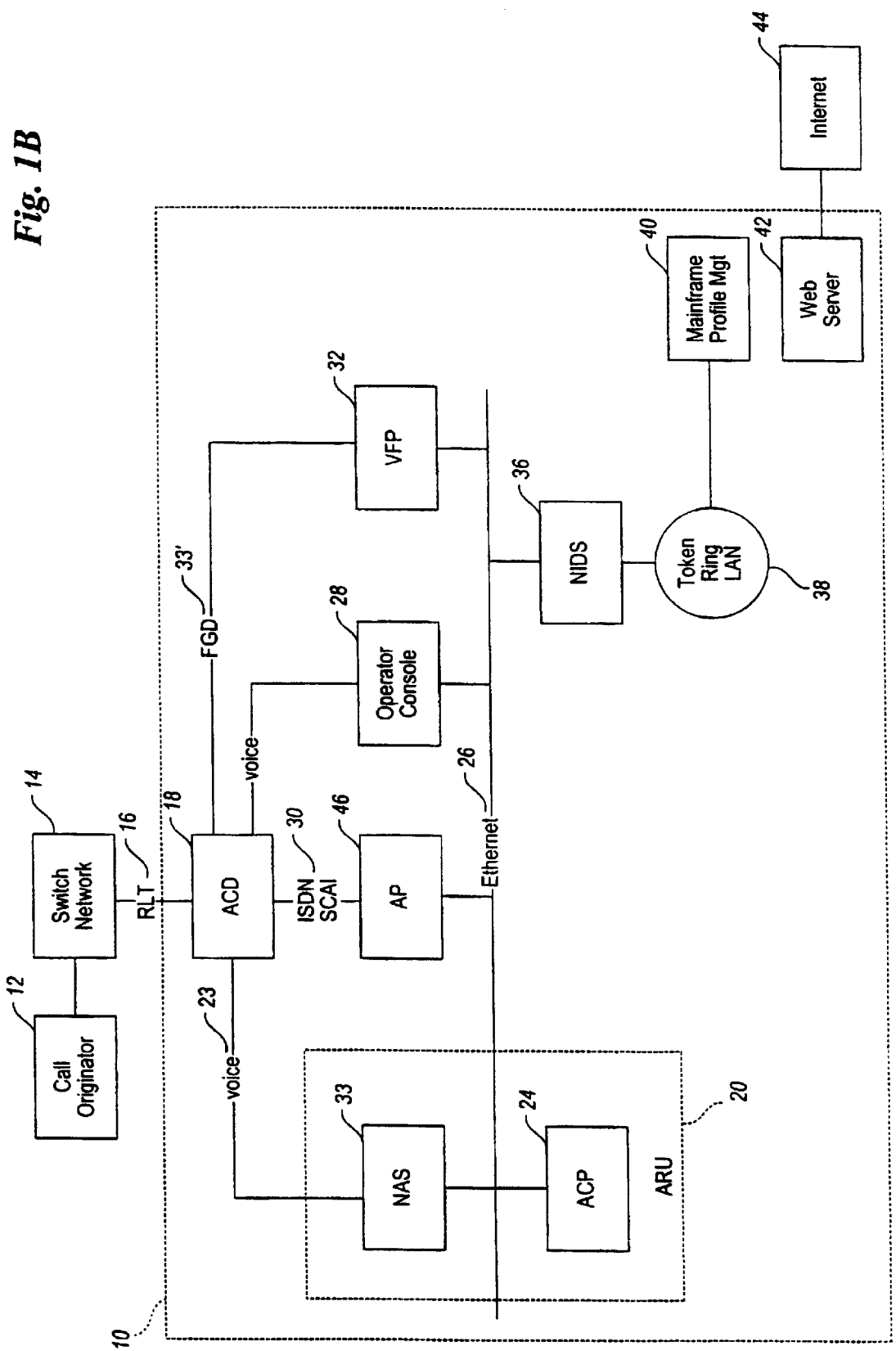
FIG. 1B is a block diagram that shows a second system configuration that is suitable for practicing the exemplary embodiment of the present invention.

FIG. 1B shows a second system configuration that is suitable for practicing the exemplary embodiment to the present invention. This second configuration differs from the first configuration in several respects. First, there is no NIDS within the ARU and no NIDS associated with the VFP. In this second system configuration, database queries from the ACP 24 in the VFP 32 are passed over the Ethernet LAN 26 to the NIDS 36. Second, the VFP 32 is extended directly to the ACD 18 via FGD trunks 33'. As a result, call transfers from the ARU 20 to the VFP 32 may be performed by the ACD 18 within the platform 10. There is no need for transferring the call outside of the platform.

Those skilled in the art will appreciate that the system configurations shown in FIGS. 1A and 1B are intended to be merely illustrative. For example, multiple platforms may be implemented within a given telecommunications system. Furthermore, multiple operator consoles 28 may be provided within the platform 10 and multiple ACDs may be provided. Each ACD may have its own associated AP. Still further, multiple ARUs may be provided within a given platform and multiple ACDs may be combined with a single VFP. Still further, the components may be connected by different types of LANs or interconnections that differ from those shown in FIGS. 1A and 1B. Additional details regarding the platform 10 and its related services are described in greater detail in copending U.S. patent applications entitled "Single Telephone Number Access to Multiple Communications Services," "Multiple Routing Options In A Telecommunications Service Platform," "Outbound Calling Services On A Telecommunications Service Platform," "Integrated Messaging Platform," and "Integrated Voicemail and Faxmail Platform For A Communications System," which were filed concurrently herewith and are assigned to a common assignee of the present application.

Figure 2:
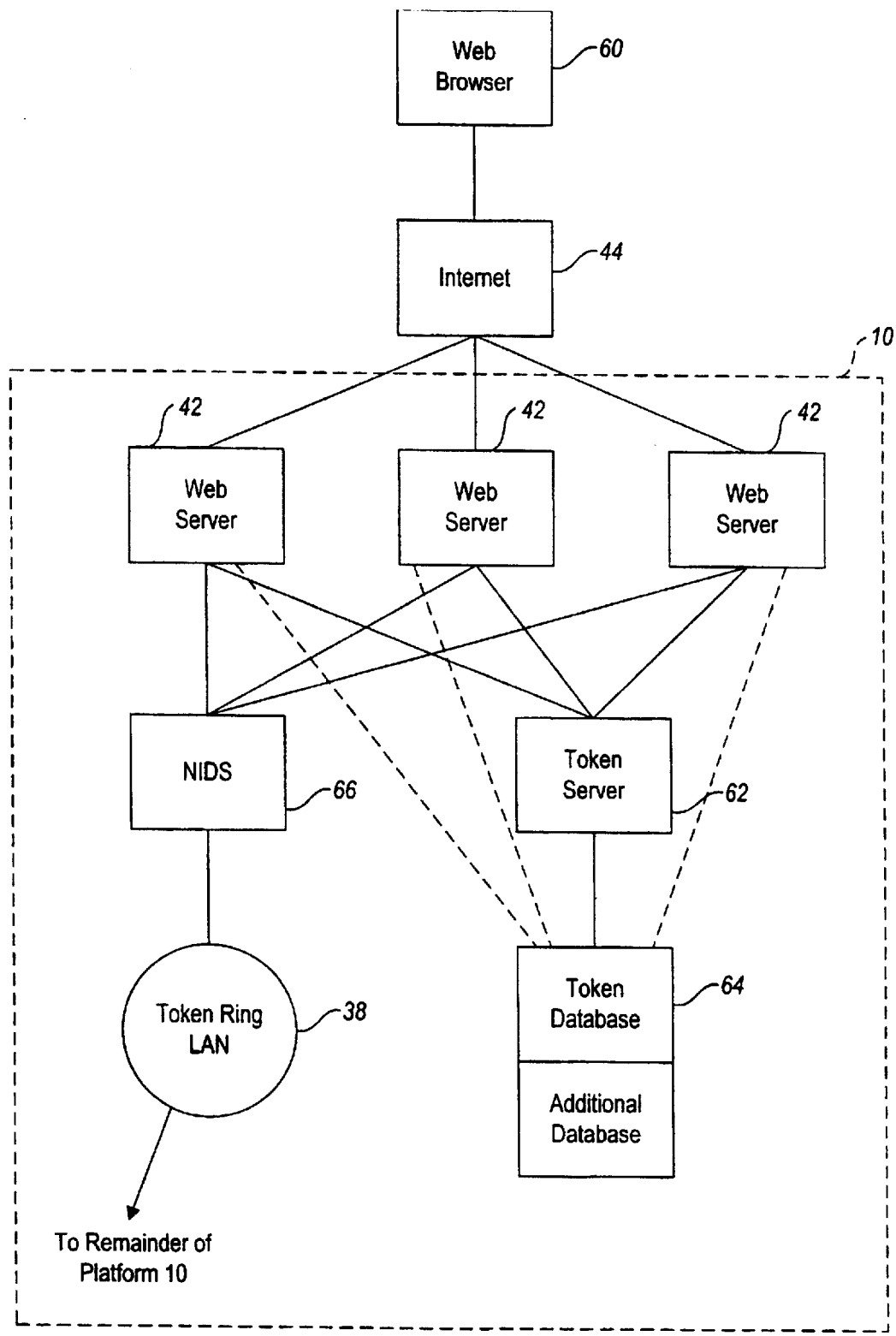
FIG. 2 is a block diagram that shows details of a portion of the system of FIGS. 1A and 1B.

Referring to FIG. 2, the logical architecture of the connection between the platform 10 and the Internet 44 is shown. The architecture is logical, in that many server components can be realized on a computer sharing resources (e.g. memory, processors, etc.). While three web servers 42 are shown in FIG. 2, the platform 10 can employ a fewer or greater number of web servers depending upon Internet traffic volume at the platform.

The web servers 42 can employ separate application servers (not shown). Each application server is dedicated to one or more applications, such as management of subscriber profiles, personal web spaces for subscribers, message centers for E-mail, voicemail and/or faxmail, subscriber profiles for smart cards, etc. Additional application service can be added to each web server 42 as additional applications are added to the platform 10.

A subscriber employs any of various web browsers 60, such as Internet Navigator® by Netscape Corp. The subscriber accesses the Internet 44 by employing any Internet service provider (ISP). Via the web browser 60, ISP and Internet 44, the subscriber accesses one of the web servers 42. The web servers 42 run an appropriate web operating system such as Netscape's Commerce Server HTTP Server in secure mode. As used generally herein, "secure" refers to using the secure socket layer (SSL) or other method of ensuring that the connection between web browser 60 and the web server 42 is secure. Using SSL prevents data or tokens (described below) from being stolen without having physical access to the subscriber's platform on which the web browser 50 is operating.

In response to a request for access to a subscriber profile, the web server 42 requests a token from a token database 64, via a token server 62. While the token server 62 is shown in FIG. 2 as a separate box coupled to each of the web servers 42, each of the web servers can have its own token server, and thereby share a common hardware platform. Token information is maintained by the token database 64. The token database 64 stores not only information regarding the tokens, but also provides additional databases of information, such as passwords, subscriber identification codes, etc., and thus is referred interchangeably as the token database 64 and the database 64 herein. The token server 62 and token database 64 are used for subscriber login and authentication, as described below, and are particularly helpful for security of the platform 10. When a validated token is issued by the token server 62, the token is used to track state information for a subscriber's interaction with the web server 42 ("a web session"). Issued and validated tokens permit the subscriber to access the subscriber's profile stored on one or more of the NIDS 27, 34, and/or 36, via the LAN 38.

The web servers 42 perform two main tasks. First, the web servers 42 authenticate users by first authenticating subscribers at login, as described below. Second, the web servers 42 send at least a service default page or screen to subscribers, which is an initial screen presented to the subscriber, as described below.

Figure 3:
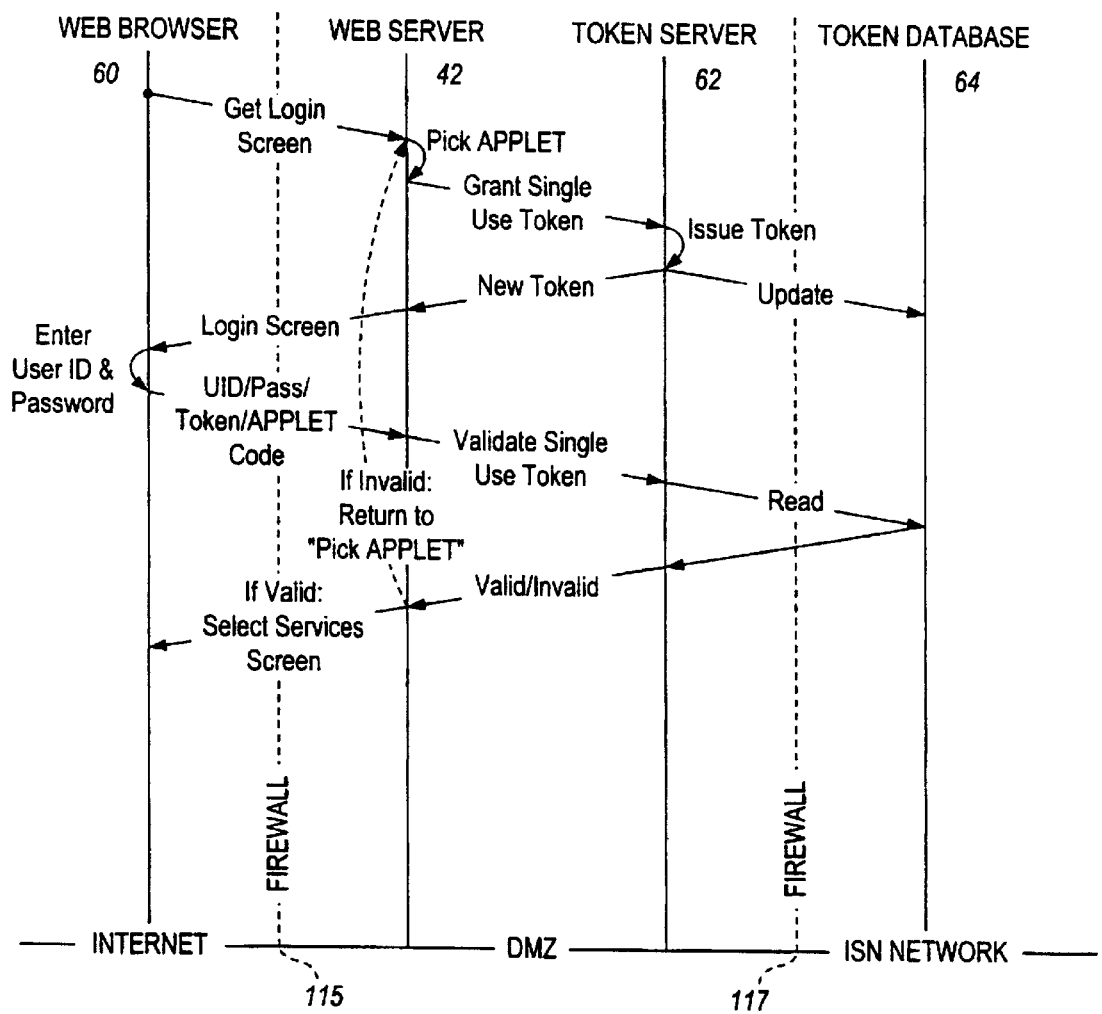
FIG. 3 is a data or message flow diagram illustrating an initiation or login process of a subscriber.

An optional NIDS 66 can also be coupled to, or reside with, the web server 42 and which communicates with the LAN 38. The NIDS 66 passes subscriber profile updates to the mainframe profile management 40 over the LAN 38. As described herein, the NIDS 66 is isolated from the web server 42 by a router-based firewall 117 (FIG. 3). The firewall 117 also isolates the token database 64 from the token server 62 and web server 42. Another firewall 115 shields the web servers 42 from the Internet 44. In general, a "firewall" is a combination of hardware and software which limits the exposure of a computer or group of computers to an attack outside. Thus, the firewall 115 enforces a boundary between the Internet 44 and the web servers 42, while the firewall 117 enforces a boundary between the token database 64 and NIDS 66 (and other NIDS databases) and the token server 62 and web server 42.

As shown in FIG. 3, the platform 10 employs the first firewall 115 between the subscriber and the subscriber's web browser 60, and the web server 42. The second firewall 117 extends between the token server 62 and the token database 64. As a result, a data management zone (DMZ) extends between the first and second firewalls 115 and 117 to separate the web server 42 and token server 62 from the Internet (by the first firewall 115) and data stored in the token database 64 (by second firewall 117).

III. System Operation

Access to subscriber profiles begins with a login and authentication process. An exemplary login and authentication process for a subscriber is described below with respect to the data flow diagram of FIG. 3, the flow charts of FIGS. 4A–4C and the screen graphics of FIGS. 5–7. The flow charts of FIGS. 4A–4C chronologically present the steps performed by the web browser 60, web server 42, and token server 62.

Figure 4:
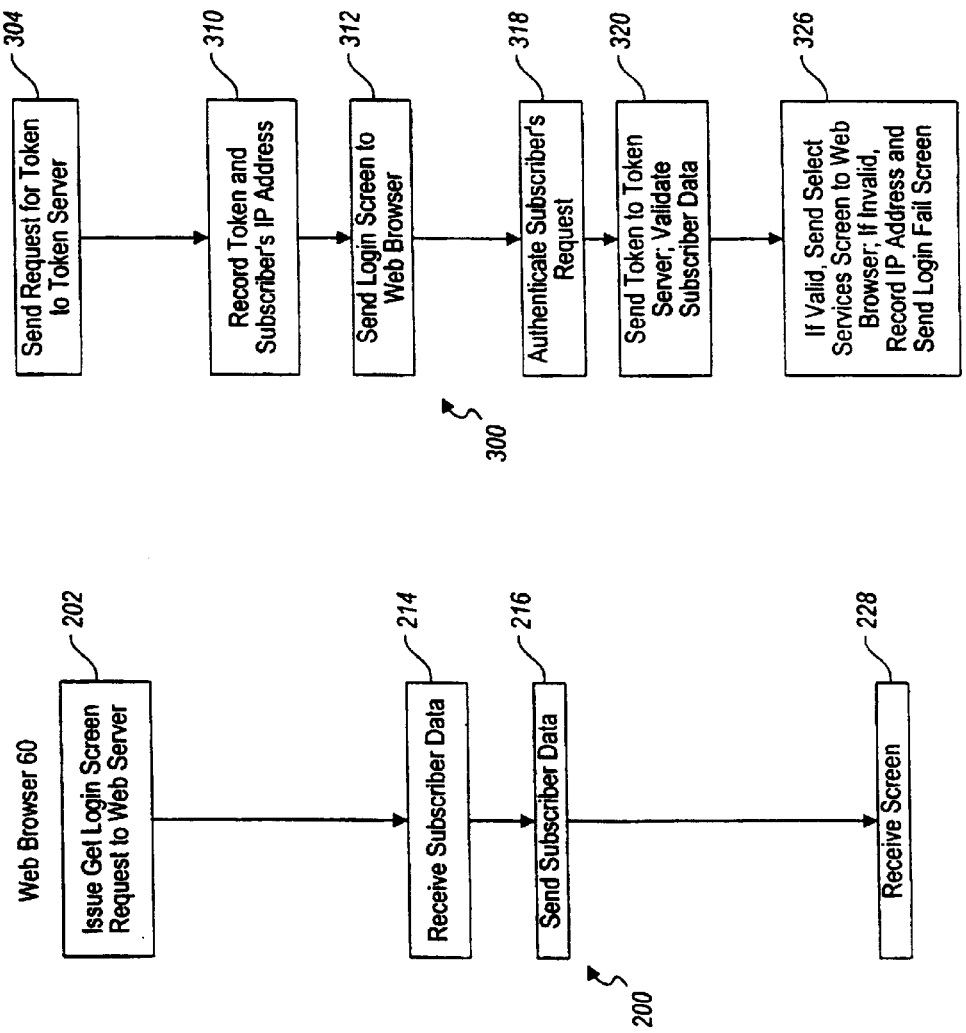
FIGS. 4A, 4B and 4C are flow diagrams showing steps performed by a web browser, web server and token server, respectively, of FIG. 2 during the login process of FIG. 3.

A subscriber interacting with the web browser 60 causes the web browser to issue a "get login" request screen to one of the web servers 42 in step 202 of a routine 200 (FIG. 4A). In step 202, the subscriber requests connection to the web server 202 by inputting an appropriate uniform resource locator (URL) such as "directline.MCI.com." One or more of the web servers 42 can be assigned to this URL. One of the web servers 42 is selected from the set of web servers using any desired algorithm, such as round-robin addressing.

The web servers 42 contain collections of Hypertext documents or Hypertext mark-up language (HTML) pages. The terms "screen" and "page" are generally used interchangeably herein. The web browser 60 accesses individual HTML pages using the known Hypertext transport protocol (HTTP). Thus, the exemplary URL which the web browser 60 provides to the Internet 44 has the form "HTTP:// directline.mci.com." The token server 62, in general, listens for appropriate commands on Transmission Control Protocol (TCP) ports for request for tokens from the web server 42. The token server 62, in turn, requests validation of a token from the token database 64.

An HTML page is sent from the web server 42 to the web browser 60. As is known, an HTML page describes, among other things, the structure of a document for display on a computer screen. The initial HTML page checks the web browser 60 for any required standards or language compliance and displays a welcome message. For example, the initial HTML page confirms that the web browser 60 is compliant with or can interpret short applications or applets written in a given language, such as Java. If the web browser 60 is not compliant, the web server 42 issues an appropriate message indicating that the web browser can not be employed to access and/or update the subscriber's profile.

In response to the "get login" request from the web browser 60, the web server 42 in step 304 of a routine 300 sends a request for a single use token to the token server 62 (FIG. 4B.) In step 304, the web server 42 also receives the subscriber's IP address which is associated with the subscriber's initial request. The token server 62, in response to the token request, issues a token in step 404 of a routine 400 (FIG. 4C.) The routines 200, 300 and 400 are performed by the web browser 60, web server 42 and token server 62, respectively. In step 406, the token server 62 updates the token database 64 that the selected token has been issued, as well as additional data, such as time of issuance, and identification of receiving web server. In step 408, the token server 62 sends the selected token to the web server 42.

Figure 5:
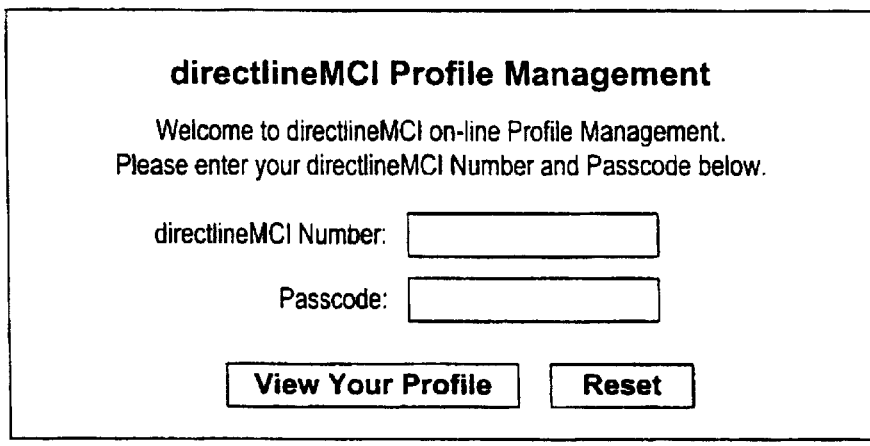
FIG. 5 is a front view of a computer screen showing an exemplary subscriber login screen.

In step 310, the web server 42 records the identification (ID) of the selected token, as well as a network connection address, such as an Internet Protocol (IP) address of the subscriber. (FIG. 4B.) In an exemplary embodiment, the web server 42 in step 318 selects one of multiple different encrypting or scrambling applets stored in a database within the web server. The web server 42 records the selected applet in the database, together with the identification of the selected token and the subscriber's IP address. In step 312, the web server 42 sends the login screen to the web browser 60. Additionally, the web server 42 scrambles the token with the selected applet and sends the scrambled token and applet to the web browser 60. An exemplary initial login screen that the web browser 60 displays to the subscriber is shown in FIG. 5. The login screen 120, as well as other screens or pages described herein, are common gateway interface (CGI) script generated pages that contain an embedded single-use token, a small application program (applet) and form fields for the user to identify or input information, such as the user's identification code and password, as described more thoroughly below.

In step 214, the web browser 60 receives the login screen 120, which instructs the subscriber to input certain subscriber data. For example, the subscriber is asked to input his or her user identification code and a password (FIG. 4A.) The user identification code can be the same as the subscriber's 800 number (single telephone number), for convenience. The user identification code will likely be a non-confidential number. Conversely, the password is a confidential alpha-numeric string selected by the user, such as a six digit number. The password is the same as the password used by the subscriber to access the user options via the ARU 20. In step 216, the web browser 60 sends the user identification code, password and token to the web server 42.

In step 318, the web server 42 authenticates the login request. The web server 42 compares the data recorded in step 310 with the received data to confirm that the subscriber's IP address, the token's ID and other data correlate. As a result, the web server 42 in step 310 confirms that subscriber has not manipulated the data, such as altering the token. In step 318, the web server 42 can also compare the IP address to a table of hostile IP addresses stored in a database. The hostile IP address table lists IP addresses of potential attempts to breach the security of the platform 10. If the received IP addresses match one of the addresses on the hostile IP address table, then the web server 42 sends a login fail screen (as described below with respect to FIG. 7.) The hostile IP address table can be stored in the database 64 or in a database at the web server 42. Each record of hostile IP addresses include the following fields, where the numbers in parentheses correspond to the number of characters or bytes for each field:

1. Hostile IP address (16);
2. Number of invalid accesses attempted by IP address;
3. First time IP address accessed the platform 10 (4); and
4. Last time IP address failed to access the platform 10 (4).

In step 320, the web server 42 sends the token to the token server 62. In step 422, the token server 62 validates the token (FIG. 4C.) The token server 62 sends a request to or actually accesses the token database 64 for data corresponding to the previously issued token. If the token is still identical to that previously issued in step 404, then the token server 62 sends a valid response to the web server 42 in step 424. In step 320, the web server 42 also validates the subscriber data (e.g. user identification code and password). The web server 42 sends a request to or accesses the database 64 to access a password corresponding to the user code. If the password stored in the database 64 matches the password received in the subscriber data, then the web server 42 validates the subscriber data. Alternatively, if the passwords do not match or the token has been altered, then the web server 42 invalidates the request or the token server 62 sends an invalid response to the web server.

Figure 6:
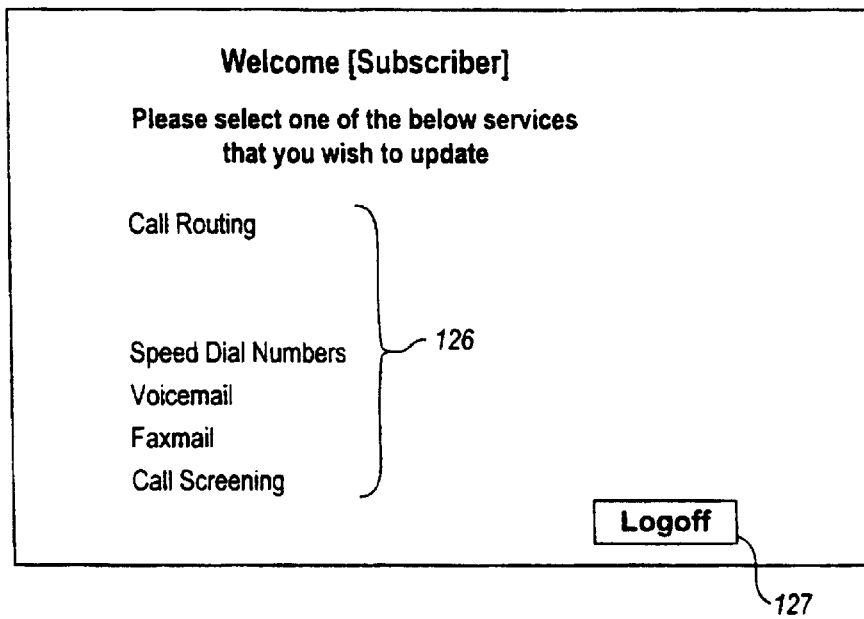
FIG. 6 is a front view of a computer screen showing an exemplary select services screen.
Figure 7:
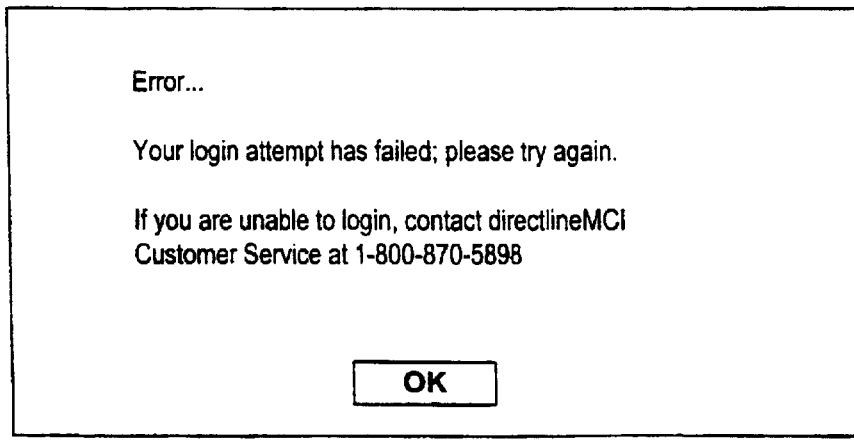
FIG. 7 is a front view of a computer screen showing an exemplary login fail screen.

In step 326, the web server 42 sends a select services screen to the web browser 60 in response to the valid response message from the token server 62 (FIG. 4B.) The token will be embedded in the select services screen and all subsequent screens for the current session with the subscriber. As a result, the token tracks the current session with the subscriber until the subscriber logs off, as described in more detail below. If the web server 42 determines that the password is incorrect or receives an invalid response message from the token server 62, the web server transmits a login fail screen. An exemplary login fail screen 124 is shown in FIG. 7. The user must then repeat the above steps to attempt to login a second time. During each login attempt, the web server 42 increments a login counter, and records the subscribers' IP address in the hostile IP address table. If the subscriber successfully logs in, then the login counter is reset to 0 and the subscribers' IP address is removed from the hostile IP address table. If the user fails to login after a predetermined number of times (e.g., the login counter= three,) then the web server 42 in step 326 records the subscriber's IP address in the hostile IP address table. Thereafter, whenever that subscriber's IP address is encountered, a time-out counter is reset during each login attempt which delays his or her login attempt. The number of attempts at logging in are also recorded in the hostile IP address table. Subsequently, in step 228, the web browser 60 receives either select services screen or the login fail screen (FIG. 4A.) An exemplary select services screen 122 is shown in FIG. 6.

Figure 8:
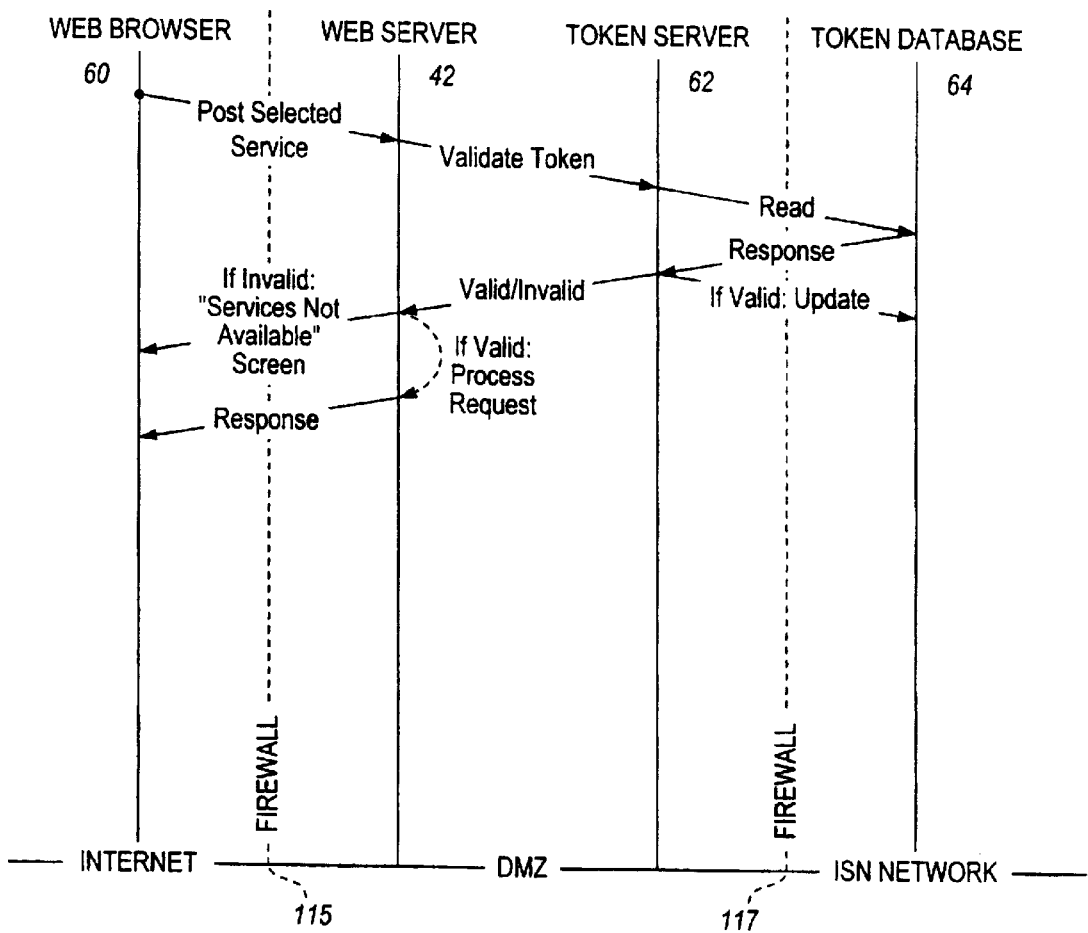
FIG. 8 is a data or message flow diagram illustrating a service selecting process.

An exemplary subscriber selection of services will now be described with respect to the data or signal flow of the diagram in FIG. 8 and the flow charts of FIGS. 9A–9C. After logging in, the subscriber selects an option or changes data with respect to one of the subscriber's telecommunications services with respect to a screen displayed by the web browser 60. For example, the subscriber selects one of the services depicted in the select services screen 122 of FIG. 6.

In step 25 of a routine 250, the web browser 60 posts the selected service to the web server 42 (FIG. 9A.) In steps 354 and 356 of a routine 350, the web server 42 authenticates the subscriber's request (FIG. 9B) while the token server 62 validates the request in step 458 of a routine 450 and sends a valid or invalid response to the web server in step 460

(FIG. 9C) in a manner substantially similar to that described above with respect to the routines 300 and 400. The routines 250, 350 and 450 are performed by the web browser 60, web server 42, and token server 62, respectively.

In step 362, the web server 42 processes the request and issues a response to the subscriber, possibly with a new screen. The web server 42 forwards any changes to the subscriber's profile to the mainframe profile management system 40, via the LAN 38, as described herein. For example, the subscriber may select one of the service options from the screen 122 of FIG. 6, and in response thereto, receive a screen for the selected service, such as the screens shown in FIGS. 10–16 (described below.)

If the web server 42 receives an invalid response message from the token server 62, the web server issues a "service not available" screen. For example, if the subscriber's IP address matches an address in the hostile IP address table, or the subscriber's token has expired, then the web server 42 forwards the login fail screen 124. In step 264, the web browser 60 receives the response and/or screen from the web server 42 (FIG. 9A.) In response to the processed request, the user may select additional services. If so, the steps under the routines 250, 350 and 450 are repeated for each additional service request performed by the subscriber. As a result, when a subscriber makes his selection in one of the service screens, the selection is accompanied by the token initially issued during login. This token is validated at every access attempted by the subscriber during service selection.

Selection and updating of the subscriber's profile will now be described with the respect to the screens of FIG. 6 and FIGS. 10–18. In general, the exemplary embodiment of the present invention allows subscribers to update their profiles, including adding or changing telephone numbers in their find-me routing, change schedules in their follow-me routing, add default or alternative routing, and numerous other possibilities described herein. These updates are entered by subscribers via user-friendly GUI having screens shown in FIGS. 5–18, which are provided by the web server 42 to the subscriber's web browser 60. As subscribers update services in their profiles, the web server 42 sends the updated profiles to the mainframe profile management system 40, via the LAN 38. The mainframe profile management system 40 updates the centralized subscriber's profile database of records, and distributes the updated records to the distributed NID's 27, 34, 36, and 66.

After the login and authentication process, the web browser 60 displays the service select screen 122 of FIG. 6, as noted above. The subscriber can select one of several service options, such as call routing, speed dial numbers, voice mail, fax mail, call screening, etc. Each of the subscriber service options in the select services screen 122 of have a Hypertext link that links with an associated screen as follows: the call routing option links to a screen 128 of FIG. 10 (which in turn links to screens 130 and 132 of FIGS. 11 and 12), the speed-dial number option links to a screen 134 of FIG. 13, the voicemail option links to a screen 136 of FIG. 14, the faxmail option links to a screen 138 of FIG. 15, and the call screening option links to a screen 140 of FIG. 16. The user may select one of the service options depicted in the screen of FIG. 6 by placing their cursor and clicking on the service, or other known user input and selection methods.

The select services screen 122 also includes a log off button 127. By clicking on the log off button 127, the subscriber can immediately log out of the subscriber's current session. The web server 42 immediately expires a time limit on the current token and sends the login screen 120 to the web browser 60.

Figure 10:
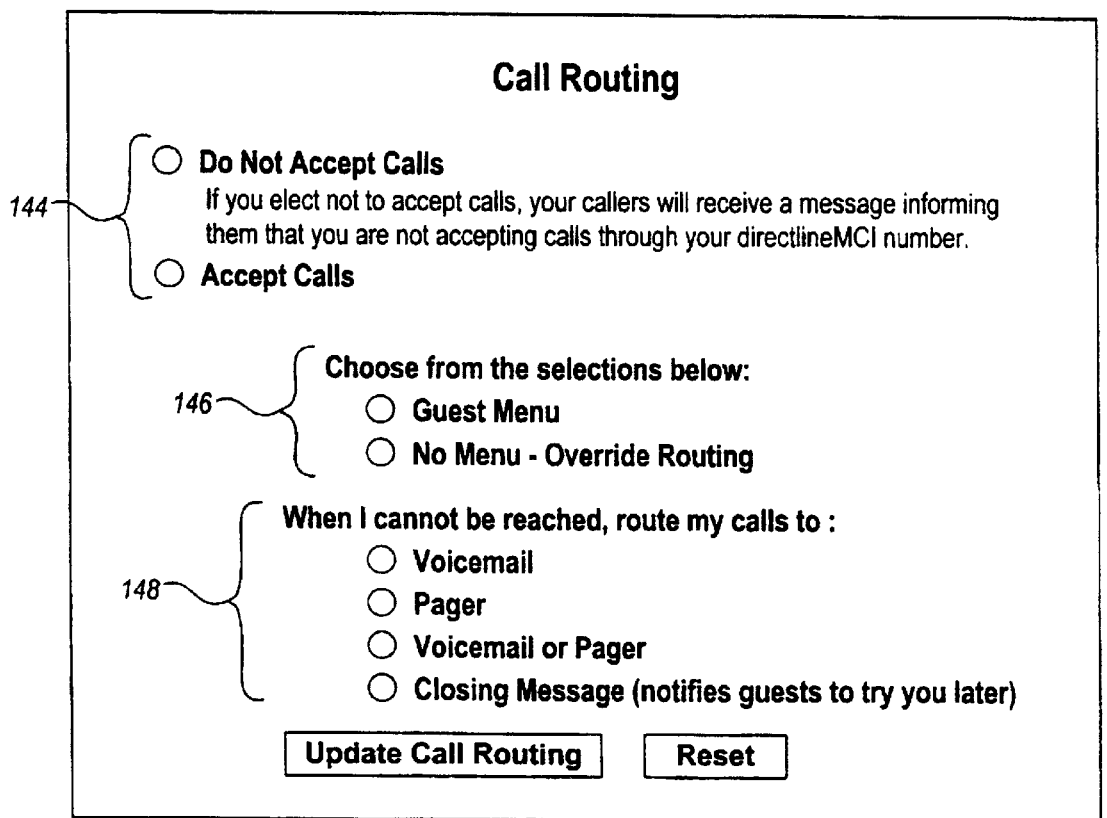
FIG. 10 is a front view of a computer screen showing an exemplary call routing option screen.

Referring to FIG. 10, if the subscriber selects the call routing option from the select services screen 122, the web server 42 routes the screen 128 for display by the web browser 60 to the subscriber. In an accept calls section 144 of the screen 128, the subscriber specifies whether calls are accepted on the subscriber's account by selecting one of two buttons displayed on the subscriber's computer screen. If the subscriber selects the do not accept calls button, then callers to the subscriber will receive a message informing them that the subscriber is not accepting calls through the subscriber's single telephone number. In a choose selections section 146, the subscriber specifies whether a guest caller should receive a guest menu or an override routing treatment. By selecting the guest menu selection, the web server 42 sends the guest menu screen 130 to the web browser 60. Alternatively, if the subscriber selects the no menu selection, then the web server 42 sends the override routing screen 132 to the web browser 60, both of these screens being described below.

In a subscriber unavailable section 148 of the screen 128, the subscriber specifies a treatment for calls received when the subscriber cannot be reached (alternative termination). Under section 148, the subscriber determines whether calls are terminated at the subscriber's voicemail, pager, voicemail and pager, or whether guest callers receive a closing message if the subscriber cannot be reached. After selecting or updating any of the options presented in the screen 128, or the other screens discussed herein, the web server 42 provides a status message on the screen for the subscriber. For example, after the subscriber selects the closing message option in the alternate termination section 148, the web server 42 sends a closing message "callers will hear a message asking them to try their call later," which a web browser 60 displays on the screen 128 to the subscriber.

Referring to FIG. 11, if the subscriber selects the guest menu selection in the call routing screen 128, the web server 42 sends the guest menu screen 130 for display by the web browser 60. In a Findme routing section 150, the guest menu screen 130 presents options for the subscriber to schedule routing of calls to them and provide up to three numbers to sequentially try to locate the subscriber. In the exemplary embodiment, the subscriber inputs up to three numbers and the number of rings to be performed at that number before attempting an alternate number. Leading "1" numbers and all non-numbers (e.g., parentheses and dashes) in domestic numbers are stripped from any numbers input into the three boxes shown in section 150. The number of rings are preferably stored in the subscriber's profile in terms of seconds based on a formula of six times the number of rings, with a default value of three rings (eighteen seconds) if the subscriber enters no value. Zero to eight seconds translates to one ring, while any value greater than eight seconds is divided by six, with the rounded result referring to the number of rings, up to a maximum of sixteen.

In a second selection section 152, the guest menu screen 130 shows that guest callers can leave both a voicemail and a fax. The subscriber can also select whether guest callers can send a page. Certain options may only be deselected, such as sending a fax, by communicating with an operator at the operator console 28 (FIG. 1A).

Referring to FIG. 12, the override routing screen 132 provides a confirmation to the subscriber that a subscriber wishes to route guest calls to a specific destination, thereby bypassing presentation of the guest menu. The subscriber must confirm selection of the override routing under override routing screen 132.

Referring to FIG. 13, the speed-dial numbers screen 134 allows the subscriber to input up to nine speed-dial numbers via the web browser 60. As shown in FIG. 13, the speed-dial number screen 134 provides a number input section 154 that provides nine boxes for the user to input nine speed-dial numbers. The web browser 42 preferably validates all numbers it receives from the web browser 60 (as input by the subscriber). Validation of numbers input to the screen 134, and input to other screens herein, confirm that a valid international number, which has not been blocked, is entered for all international telephone numbers. For domestic numbers, the web server 42 confirms that ten digits are entered, and that a valid numbering plan area (NPA) or "area code" for the ten digit number is entered. Additionally, the web server 42 can determine if an entered number is a "976" number and whether 976 blocking is effective, or whether other specified numbers are blocked (e.g., certain North American directory plan (NADP) numbers). Assuming the web server 42 confirms that the number entered by the subscriber is acceptable, then the web server forwards the number to the mainframe profile management system 40 via the LAN 38.

Referring to FIG. 14, the voicemail service screen 136 allows the subscriber to be paged whenever the subscriber receives a voicemail message. In FIG. 15, the faxmail service screen 138 provides an option to similarly allow the subscriber to be paged whenever the subscriber receives a fax message. The faxmail service screen 138, in the exemplary embodiment, displays the subscriber's fax number.

Referring to FIG. 16, the call screening service screen 140 provides a call screening selection section 156. In section 156, the subscriber can determine how incoming calls are screened, e.g., by name only, by telephone number only, or by name and telephone number. If a guest caller fails to provide their name, the platform 10 will provide the guest caller's telephone number.

Figure 17:
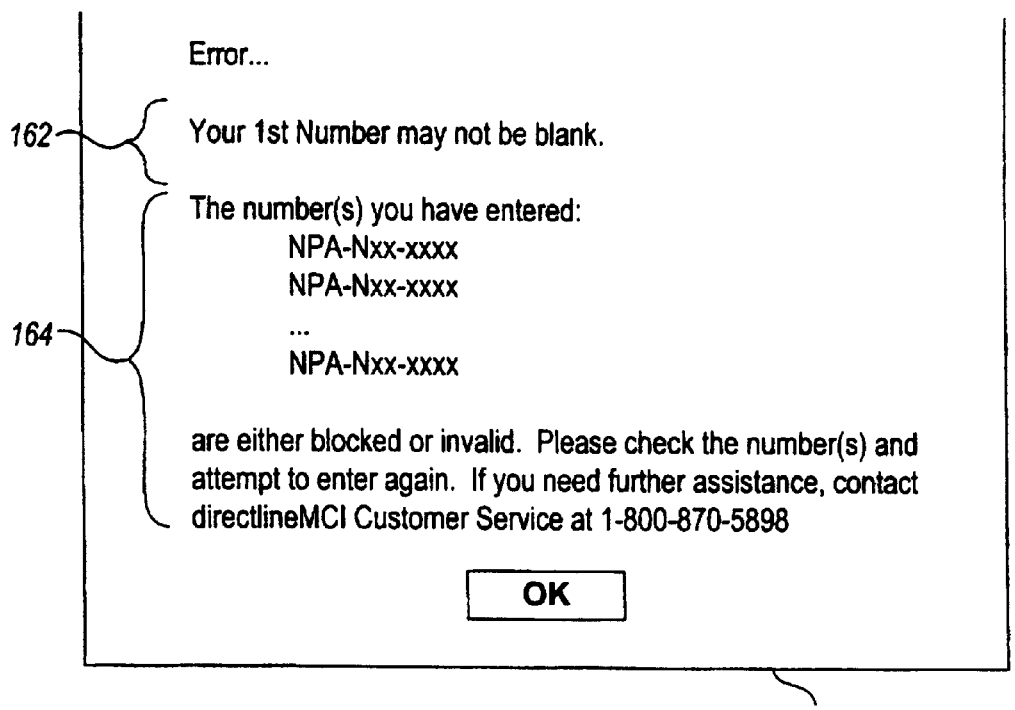
FIG. 17 is a front view of a computer screen showing an exemplary error screen.

Referring to FIG. 17, an exemplary error screen 160 is displayed when the subscriber inputs, or fails to input, appropriate data. A first message 162 in the error screen 160 states "your first number may not be blank." The web server 42 sends the first message 162 to the web browser 60 if the subscriber fails to input the first number where appropriate, such as in the section 150 of the guest menu service screen 130 (FIG. 11). A second message section 164 provides an indication to a subscriber that certain numbers the subscriber entered are either blocked or invalid. As noted above, if the subscriber inputs any numbers, the web server 42 validates these numbers. If the web server recognizes an invalid number, the web server sends the second message 164 to the web browser 60.

Figure 18:
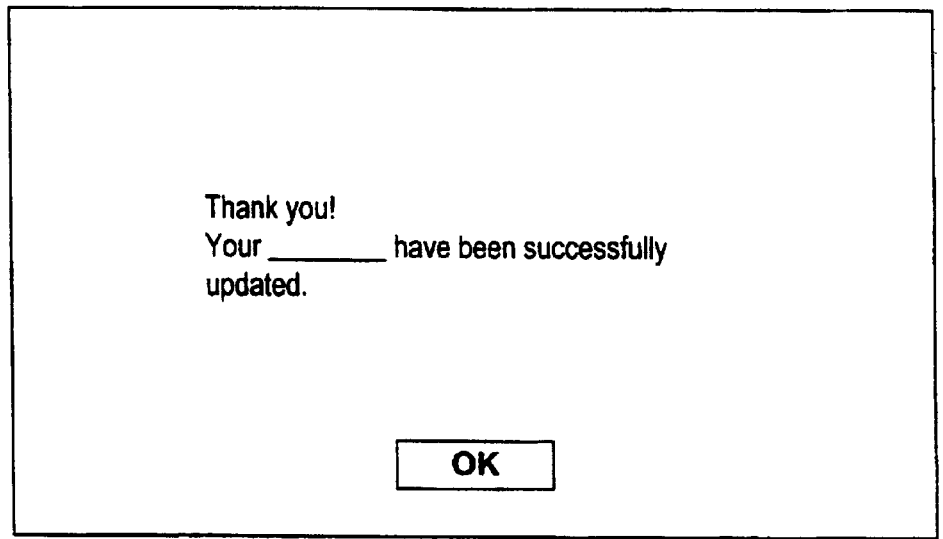
FIG. 18 is a front view of a computer screen showing an exemplary final screen.

Referring to FIG. 18, a final or exit screen 166 is shown. If the subscriber inputs the appropriate data which is validated and accepted by the web server 42, the web server transmits the data to the mainframe profile management system 40 to update the subscriber's profile. After successfully updating the profile, the web server 42 sends the exit screen 166 to the web browser 60 to provide an appropriate message to the subscriber indicating that the profile has been successfully updated. For example, the screen 166 states "your guest menu options have been successfully updated."

Figure 19:
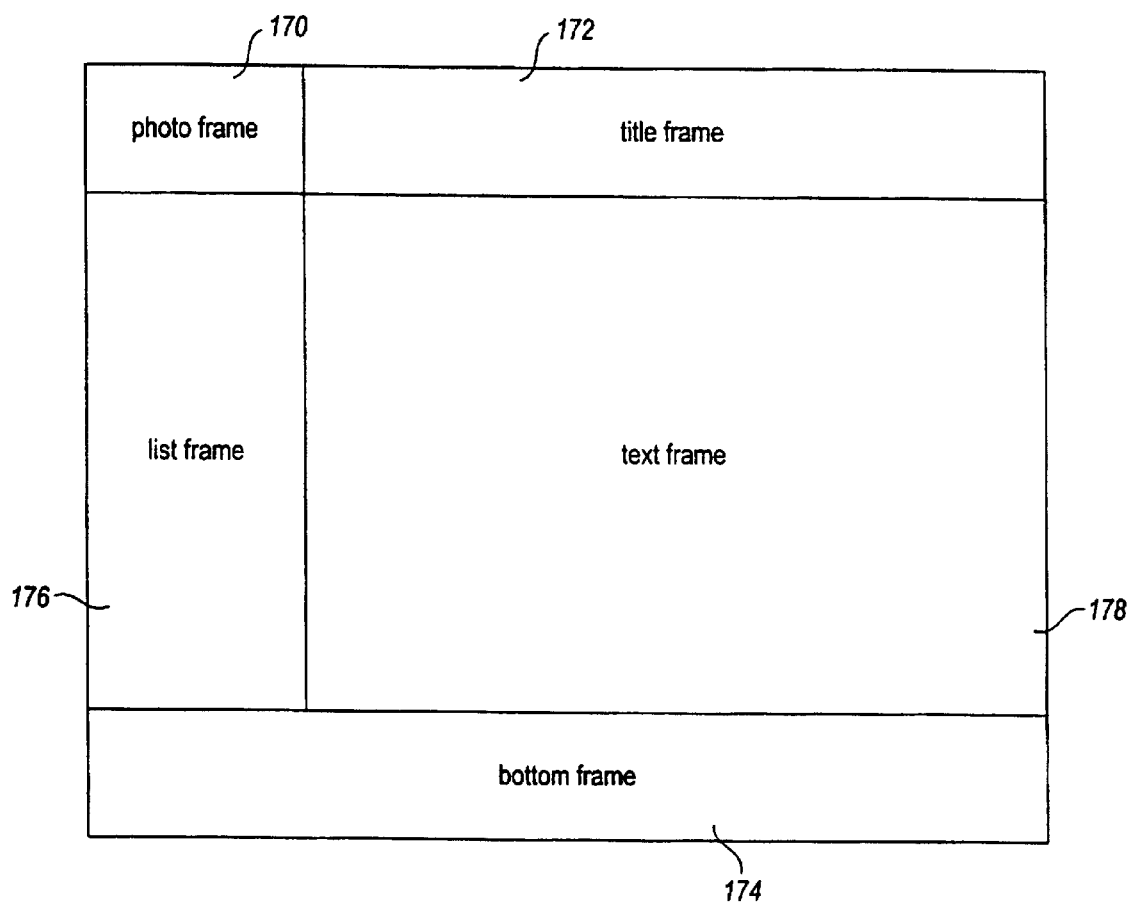
FIG. 19 is a schematic diagram of an exemplary screen layout.

Referring to FIG. 19, an exemplary HTML layout for pages and screens is shown. The photo frame 170 in an upper left corner displays a graphic or other image, and can be 40×160 pixels. The photo frame 170 in an exemplary embodiment displays a static icon for continuity between the service screens. A title frame 172 in an upper right corner of the screen displays a title for the screen. The title frame 172 can have a height of 40 pixels and a width determined by an available screen size. The graphic displayed in the photo frame 170 preferably emphasizes a particular service requested by the subscriber and displayed on the screen. In the exemplary embodiment, the title frame shows the title of the application being accessed by the subscriber. It will also display a logo of the service provider, such as "MCI." The information displayed in the title frame 172, as well as the photo frame 170, will not change for the entire session with the subscriber as long as the subscriber remains logged into the platform 10.

A bottom frame 174 at a bottom of the screen will have Hypertext links to various other services provided by the platform 10. The bottom frame 174 can have a height of 40 pixels and a width determined by the available screen size. In an exemplary embodiment, the bottom frame 174 or other screen portion contains Hypertext links to other services operated by the operator of the platform 10, such as MCI services, as well as other web sites. Such links allow the subscriber to effectively cancel from the login process and move to other services or sites if desired.

A list frame 176 at a left portion of the screen displays Hypertext links to other, screen-specific, applications and screens within the application that the user has accessed. The list frame can be 160 pixels wide and a height determined by the available screen size. A text frame 178 displays data requested by the subscriber. The text frame 178 as well as the list frame 176 will change with every new screen selected by the subscriber. The text frame 178 and the list frame 176 display screens depicted in FIGS. 5–18, which are described above.

Referring to FIG. 20, exemplary data flow within the portion of the platform 10 of FIG. 2 is shown. The flow of data shown in FIG. 20 corresponds to the above description with respect to FIGS. 3, 4A–4C, 8, and 9A–9C. In general the token database 64 includes a token database service accessed by the token server 62 to create a new record, read a record for a given token value and update a record for the given token value. A separate updating service or application is performed by the web server 42, which accesses the token database 64 and deletes obsolete records on a periodic basis (e.g., every hour). The web server 42 sequentially scans the token database 64 and deletes records with expired tokens.

Data provided by the web server 42 is stateless. State information is maintained by a write through cache database on the NIDS, and is indexed by the tokens (each of which are unique). As a result, data need not be synchronized between the multiple web servers 42. Each web server 42 also provides more than one service. The services provided by the web servers 42 are distinguished by their location in the web servers document root (described below).

The token server 62 is a client of the token database 64, and issues tokens to the web servers 42 during login attempts. The issued tokens, once validated, are used to track the state information for a connection by one of the web servers 42. As a result, the token service 62 performs essentially three tasks: (1) issue single-use tokens during authentication or login of a subscriber, (2) validate single-use tokens, and (3) validate multi-use tokens (if such tokens are used). As noted above, each token must be unique for every login request.

Referring to FIG. 21, an exemplary record for a subscriber profile is shown as a record 180. The record 180 includes numerous fields, such as speed-dial numbers, primary termination numbers and time-out values (number of rings) for the guest menu routing service, whether the subscriber is paged upon receiving a message, call screening states, etc. The record 180 corresponding to the subscriber profile is stored in the NID's 27, 34, 36, and 66. The fields of the record 180 are generally self-explanatory with reference to the detailed description provided herein.

The web servers 42, and the platform 10 in general, must be secure against pirates, hackers and other malcontents who wish to adversely affect the platform 10 or retrieve data without authorization. Thus, the web servers 42 preferably run secure daemons. For example, the web servers 42 run the secure HTTP daemon. As is known, a "daemon" is an agent program which continuously operates, such as on a UNIX server, and provides resources to client systems on the network. In general, a daemon is a background process used for handling low-level operating system tasks.

Figure 22:
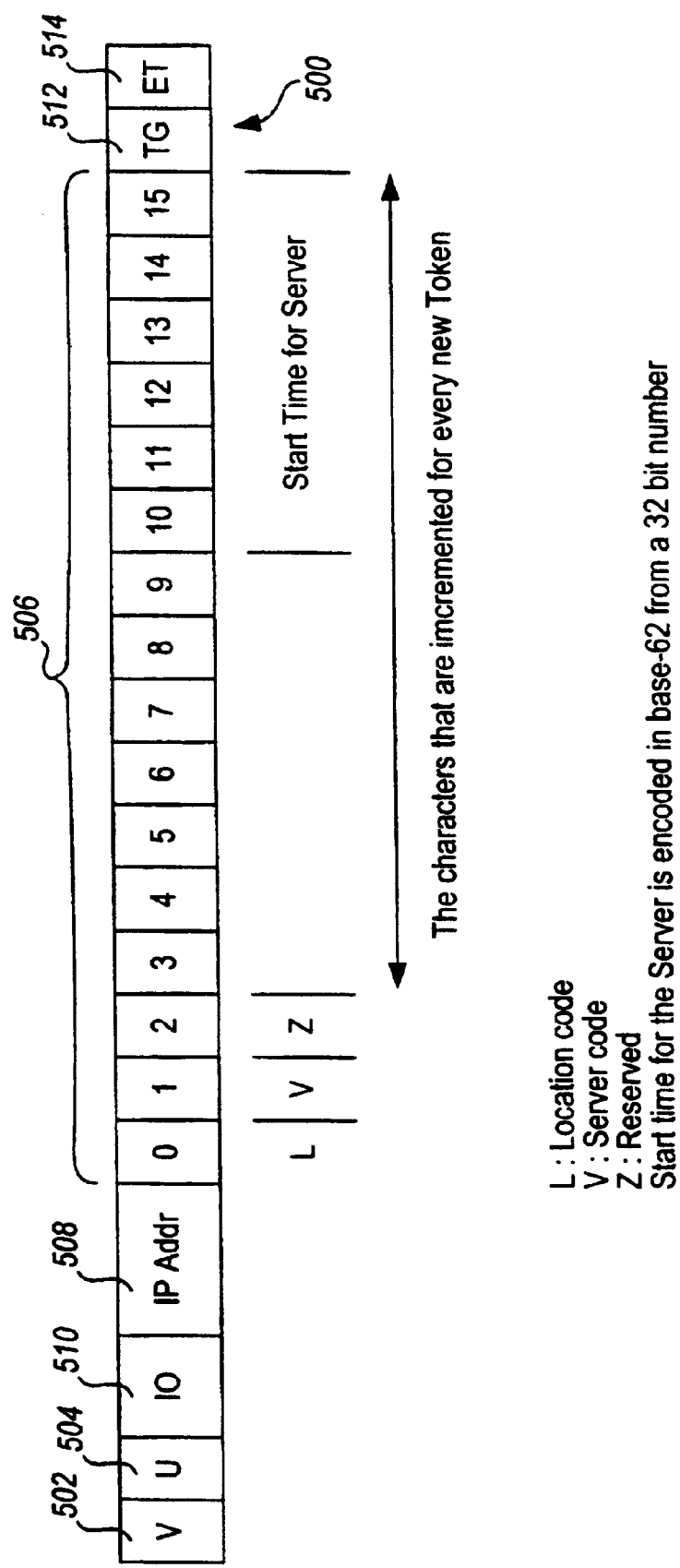
FIG. 22 is an exemplary data structure of a token.

The tokens employed herein also provide security for the platform 10. Referring to FIG. 22, an exemplary token 500 is shown. The token 500 includes the following fields, with exemplary number of bytes or characters represented in parentheses:

1. a version 502 (1);
2. a use flag 504 (single versus multiple use) (1);
3. a token value 506 (16);
4. an IP address of the subscriber 508 (16);
5. a user ID code 510 (16);
6. a time granted 512 (4); and
7. an expiring 514 (4).

The IP address field is large enough to hold the extended IP version 6 addresses if required. A time-out timer is associated with the time granted 512 and expiring time 514 values of each token so that a token which has been unused for a certain period of time (e.g., ten minutes) is invalidated by the web server 42.

The token valve 506 includes 16 characters, where each character has 62 possible character values, which are selected from the set (0–9, a-z, A-Z). The characters in positions 0, 1 and 2 of the token valve 506 are fixed and are assigned to the token server 62. If multiple token servers 62 are employed, the characters in positions 0, 1 and 2 uniquely define each token server and thus each token employed by the web servers 42 are unique. The character at position 0 is used to identify a physical location of the token server 62. The character at position 1 identifies the server at the physical location, while the character at position 2 has a reserved value, which could be used to identify the version number of the token server 62, or other information.

The remaining 13 characters of the token valve 506 are generated sequentially using the 62 possible character values. The character positions 10–15 are assigned a current time for the platform 10 (at set-up of the token service 62). The system time (a 32-bit quantity) is computed as a 6-digit base 62 number which is placed in positions 10–15. Token values are incremented sequentially throughout positions 3–15, with position 3 being the least significant position. Character values assume the following order for high to low digit values: "z"–"a", "Z"–"A" and "9"–"0". As a result, the token server 62 generates unique tokens if the system time is computed in 4-byte values, which will compute a 6 base-62 characters in positions 10–15. This assumes that the token server 62 will not generate more than $62^7$ ($35*10^{12}$) tokens in one second on any given token server 62. Thus, the odds of a pirate actually guessing a token value are 1 in $4.7 \times 10^{28}$. Even a correctly guessed token value is no guarantee of successful penetration through the firewall 115 because the appropriate IP address of the subscriber must be correct and the time of the token must not have expired.

As noted above, each token is embedded in service-specific screens that the web server 42 sends to the web browser 60. If a given screen contains a form, the token may be within a hidden field of the form. If the screen contains an applet, such as a Java applet, the token may be a parameter of the applet. If the screen contains Hypertext links (e.g., a Hypertext reference (HREF) specifying the name or URL of the file to which the Hypertext link points), the token may be part of the link itself In general, a particular value of a given token need not necessarily be kept secure. The security of the token is provided by employing SSL within the platform 10, expiring or time-out tokens, and linking the token to the subscriber's (client's) IP address.

Figure 23:
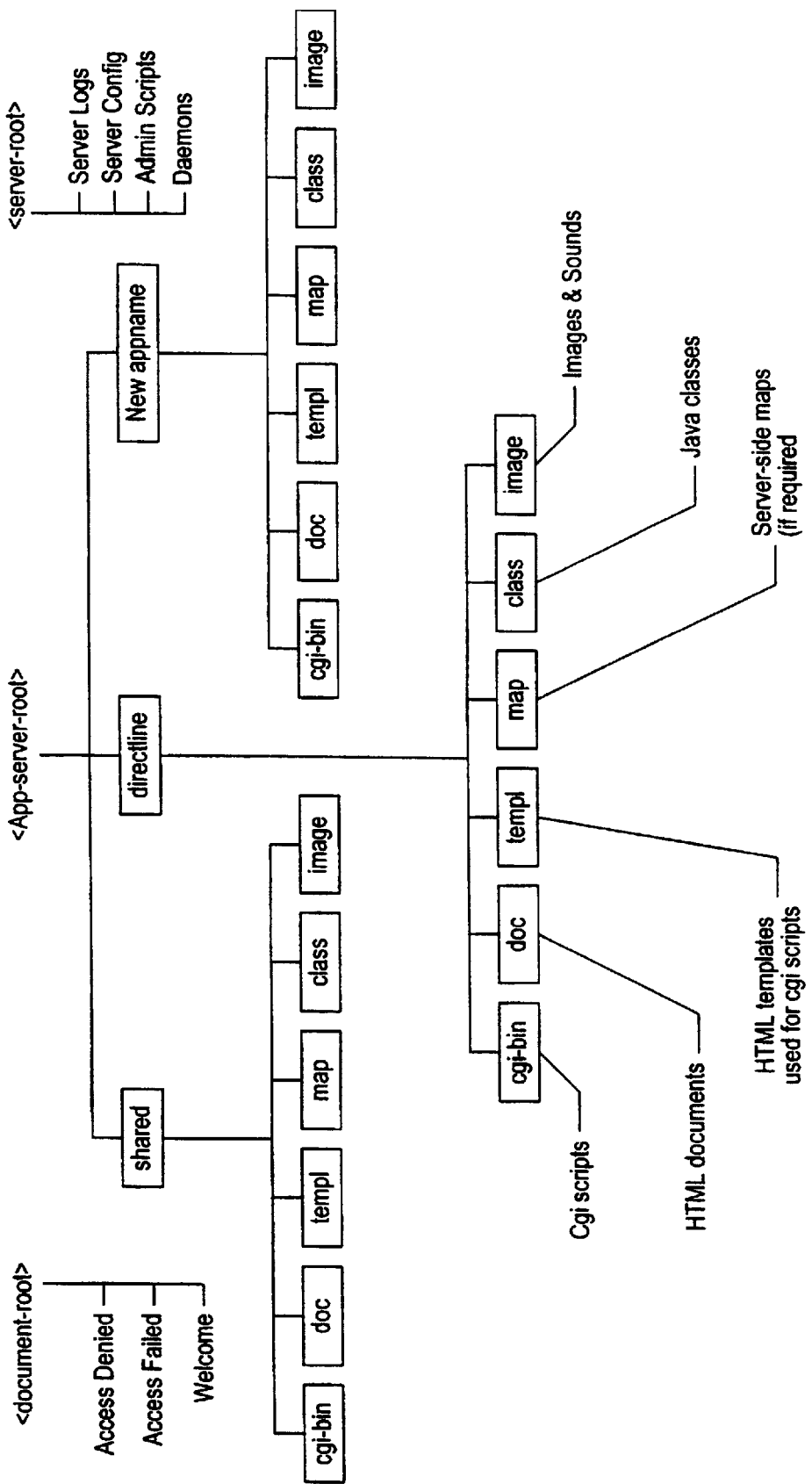
FIG. 23 is an exemplary directory structure employed by the web servers of FIG. 2.

In an exemplary embodiment, all of the HTML pages which the web servers 42 send to the web browser 60 are generated using common rules in a common language, such as Perl-based Common Gateway Interface (CGI) scripts. As is known, a CGI script is a standard method to extend the HTTP daemon, which is commonly written using Perl, C, or shell scripts. Every access by the web browser 60 to the web server 42 will map to a CGI script. Referring to FIG. 23, all of the CGI scripts preferably reside in a directory in the web server 42 which is not in the document-root directory of the HTTP daemon, to thereby provide security to the web servers 42. As noted above, the authentication of each request and the issuance of a valid token is required for every subscriber request, and thus at the start of every script.

Each application on the web server 42 will have its own document route and associated collection of CGI scripts (cgi-bin), templates, (templ), images, Java class libraries, and image map directories if required (map). An exemplary welcome server directory structure residing on the web server 42 is shown in FIG. 23. As shown in FIG. 23, the document root directory is separated from the server root directory. The document root directory holds only the welcome and access failed/denied HTML pages for reasons of security. The directories are mapped through server directives to be accessible via application-specific URLs. Many applications may store images and class libraries, as well as CGI scripts. As shown in FIG. 23, the shared objects are maintained in a separate shared directory tree. There are no URL maps to these shared objects, but instead, the shared objects are accessed via the application-specific URLs which are linked to the shared objects at startup of the platform 10. A common server root directory includes operating parameters for the web servers 42. Such information is maintained in a common database in order to maintain the same environment for the multiple web servers 42.

Although specific embodiments of, and examples for, the present invention are described herein for illustrative purposes, various equivalent modifications can be made without departing from the spirit and scope of the invention, as will be recognized by those skilled in the relevant art. The teachings provided herein of the present invention can be applied to other communications or network systems, not necessarily the exemplary telecommunications systems described above. For example, while embodiments of the present invention have been generally described above as being employed with the telecommunications platform 10, the present invention is equally applicable to other communications systems, such as a network of computers to provide updating of user records by means of The World Wide Web. While certain operations under embodiments of the present invention have been described as occurring generally in a serial fashion, those skilled in the relevant art will recognize that it is entirely within the scope of the invention to conduct some operations more or less simultaneously, or in another order from that described herein.

All of the above U.S. Patents and Applications are incorporated herein by reference as if set forth in their entirety. Embodiments of the present invention can be modified based on disclosed embodiments of the above U.S. Patents and Applications to provide yet further embodiments of the present invention.

These and other changes can be made to the embodiments of the invention in light of the above detailed description. In general, in the following claims, the terms used should not be construed to limit the invention to the specific embodiments disclosed in the specification and the claims, but should be construed to include any record updating system that operates under the claims to provide operations for updating user records. Accordingly, the invention is not limited by the disclosure, but instead its scope is to be determined entirely by the following claims.

What is claimed is:

1. In a telecommunication system having a subscriber, the subscriber receiving a plurality of services from the system through a single telephone number, a method for managing the subscriber's profile comprising:

requesting access by the subscriber, via the Internet, of an account record, the account record specifying subscriber selected options of the services;

validating the subscriber's request upon verification of a personal identification number associated with the subscriber and upon determining that an address associated with the subscriber is not hostile;

providing a menu to the subscriber if the subscriber's request is validated, the menu providing choices for the subscriber for at least one of the services;

receiving, via the Internet, subscriber input corresponding to one of the choices provided in the menu; and updating the account record based on the received subscriber input such that the updates to the subscriber's profile are ready in substantially real-time.

2. The method of claim 1 wherein the step of validating includes the steps of:

requesting and receiving a token in response to the step of requesting access;

requesting input data from the subscriber;

receiving the input data from the subscriber;

comparing the input data to corresponding stored data; and validating the token if the input data compares favorably with the stored data.

3. The method of claim 1 wherein the step of providing includes the steps of:

providing a first screen to the subscriber, the first screen providing at least some of the services;

receiving initial subscriber input, the initial subscriber input selecting one of the at least some of the services; and providing a second screen to the subscriber, the second screen providing the menu.

4. The method of claim 1 wherein the step of providing includes the step of providing a screen to the subscriber having the menu, the screen having included therewith a validated token and an executable application.

5. The method of claim 1 wherein the step of receiving includes the steps of:

again validating the subscriber's request; and updating the account only if the subscriber's request is again validated.

6. In a telecommunication system having a subscriber, the subscriber receiving a plurality of services from the system through a single telephone number, wherein the system is coupled to a network of computers, a method for managing a profile of the subscriber comprising:

requesting access by the subscriber, via the network of computers, of an account record, the account record specifying subscriber selected options of the services;

validating the subscriber's request upon verification of the subscriber's personal identification number and upon determining that an address associated with the subscriber is not hostile;

providing a menu to the subscriber if the subscriber's request is validated, the menu providing choices for the subscriber for at least one of the services;

receiving, via the network of computers, subscriber input corresponding to one of the choices provided in the menu; and updating the account record based on the received subscriber input such that the updated data is made available in substantially real-time.

7. The method of claim 6 wherein the network of computers includes the Internet, and wherein the step of requesting includes the step of accessing a site associated with the system.

8. The method of claim 6 wherein the step of providing includes the step of providing a screen to the subscriber having the menu, the screen having included therewith a validated token.

9. In a telecommunication system having a subscriber, the subscriber receiving a plurality of services from the system through a single telephone number, the subscriber being assigned multiple personal identification numbers, one of said numbers being assigned solely to be used by the subscriber, a method for managing the subscriber's profile comprising:

requesting access by the subscriber, via the Internet, of an account record, the account record specifying subscriber selected options of the services;

validating the subscriber's request upon verification of the subscriber's one personal identification number and upon determining that an address associated with the subscriber is not hostile;

providing a menu to the subscriber if the subscriber's request is validated, the menu providing choices for the subscriber for at least one of the services;

receiving, via the Internet, subscriber input corresponding to one of the choices provided in the menu; and updating the account record based on the received subscriber input such that the updates to the subscriber's profile are ready in substantially real-time.

10. In a telecommunication network, an apparatus comprising:

a memory configured to store a subscriber specific record relating to a telecommunication system, the subscriber receiving a plurality of services from the system through a single telephone number and being assigned multiple personal identification numbers, one of said numbers being assigned solely to be used by the subscriber; and a network server coupled between the memory and the Internet, the network server configured to receive a request for access, via the Internet, of the record, validate the request upon verification of the one personal identification number and upon determining that an address associated with the subscriber is not hostile, receive, via the Internet, alternate data for the record, and request alteration of the record in the memory based on the received alternate data such that the updated data is made available in substantially real-time.

* * * * *